(12) United States Patent
Ko et al.

(10) Patent No.: US 9,958,681 B2
(45) Date of Patent: May 1, 2018

(54) ELECTRONIC DEVICE AND CONTROL METHOD THEREOF

(71) Applicant: LG ELECTRONICS INC., Seoul (KR)

(72) Inventors: Dongseuck Ko, Seoul (KR); Jeongyun Heo, Seoul (KR); Yujune Jang, Seoul (KR); Jeeyoung Cheon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/029,548

(22) PCT Filed: Oct. 16, 2014

(86) PCT No.: PCT/KR2014/009747
§ 371 (c)(1),
(2) Date: Apr. 14, 2016

(87) PCT Pub. No.: WO2015/064935
PCT Pub. Date: May 7, 2015

(65) Prior Publication Data
US 2016/0252725 A1    Sep. 1, 2016

(30) Foreign Application Priority Data

Oct. 28, 2013  (KR) .................. 10-2013-0128817
Dec. 24, 2013  (KR) .................. 10-2013-0162832
Jul. 10, 2014  (KR) .................. 10-2014-0086972

(51) Int. Cl.
*G02B 27/01*      (2006.01)
*G02B 26/00*      (2006.01)
(Continued)

(52) U.S. Cl.
CPC ............ *G02B 27/0172* (2013.01); *G02B 5/04* (2013.01); *G02B 26/004* (2013.01); *G02F 1/29* (2013.01);
(Continued)

(58) Field of Classification Search
CPC .............. G02B 26/004; G02B 27/0172; G02B 27/0179; G02B 5/04; G02B 2027/0138; G02B 2027/014; H04N 9/3147
See application file for complete search history.

(56) References Cited

U.S. PATENT DOCUMENTS 8,184,067 B1 *  5/2012  Braun ................. G09G 5/00
                                                 345/7
8,223,024 B1 *  7/2012  Petrou ................ G02B 27/017
                                                 340/539.13
(Continued)

FOREIGN PATENT DOCUMENTS

JP        3871188 B2      1/2007
WO    WO 99/23525 A1      5/1999

*Primary Examiner* — Christopher E Leiby
(74) *Attorney, Agent, or Firm* — Birch, Stewart, Kolasch & Birch, LLP

(57) ABSTRACT

Disclosed is an electronic device including: a display; at least one optical lens configured to change an optical path of light generated in the display at a fixed refractive index; a prism configured to reflect the light, which has passed through the at least one optical lens, at least one time to guide the light to a destination point; a variable lens positioned in the optical path of light between the display and the destination point, a refractive index of at least a portion of the variable lens being changed by a control signal to change at least a portion of the optical path of light; and a controller configured to generate the control signal. An optical path of light generated in the display may be changed by the variable lens whose refractive index can be changed.

14 Claims, 24 Drawing Sheets

(51) Int. Cl.
  *G02B 5/04*   (2006.01)
  *G02F 1/29*   (2006.01)
  *H04N 9/31*   (2006.01)
(52) U.S. Cl.
  CPC ....... *H04N 9/3147* (2013.01); *G02B 27/0179* (2013.01); *G02B 2027/014* (2013.01); *G02B 2027/0138* (2013.01)

(56) References Cited

U.S. PATENT DOCUMENTS

| | | | |
|---|---|---|---|
| 8,467,133 B2 | 6/2013 | Miller | |
| 9,116,337 B1* | 8/2015 | Miao | G02B 27/0172 |
| 2002/0021498 A1 | 2/2002 | Ohtaka et al. | |
| 2006/0017657 A1* | 1/2006 | Yamasaki | G02B 27/017 |
| | | | 345/8 |
| 2010/0079356 A1* | 4/2010 | Hoellwarth | G02B 27/017 |
| | | | 345/8 |
| 2010/0146461 A1 | 6/2010 | Ryu et al. | |
| 2010/0271587 A1 | 10/2010 | Pavlopoulos | |
| 2011/0197147 A1* | 8/2011 | Fai | G06F 1/1639 |
| | | | 715/753 |
| 2011/0221656 A1* | 9/2011 | Haddick | G02B 27/017 |
| | | | 345/8 |
| 2011/0267321 A1* | 11/2011 | Hayakawa | G02B 27/0093 |
| | | | 345/204 |
| 2012/0032874 A1* | 2/2012 | Mukawa | G02B 3/12 |
| | | | 345/8 |
| 2012/0147342 A1* | 6/2012 | Lin | G03B 3/04 |
| | | | 353/122 |
| 2013/0057679 A1* | 3/2013 | Tiao | G09G 5/00 |
| | | | 348/135 |
| 2014/0145914 A1* | 5/2014 | Latta | G06F 1/3215 |
| | | | 345/8 |
| 2014/0247343 A1* | 9/2014 | Chen | G02B 27/017 |
| | | | 348/135 |
| 2014/0293434 A1* | 10/2014 | Cheng | G02B 27/225 |
| | | | 359/630 |
| 2014/0333734 A1* | 11/2014 | Yang | H04N 13/044 |
| | | | 348/53 |
| 2014/0355128 A1* | 12/2014 | Tsai | G02B 3/14 |
| | | | 359/666 |
| 2015/0067516 A1* | 3/2015 | Park | G06F 3/167 |
| | | | 715/728 |
| 2016/0349849 A1* | 12/2016 | Kwon | G06F 3/011 |
| 2017/0102917 A1* | 4/2017 | Park | G06F 3/167 |

* cited by examiner

[Fig. 1]
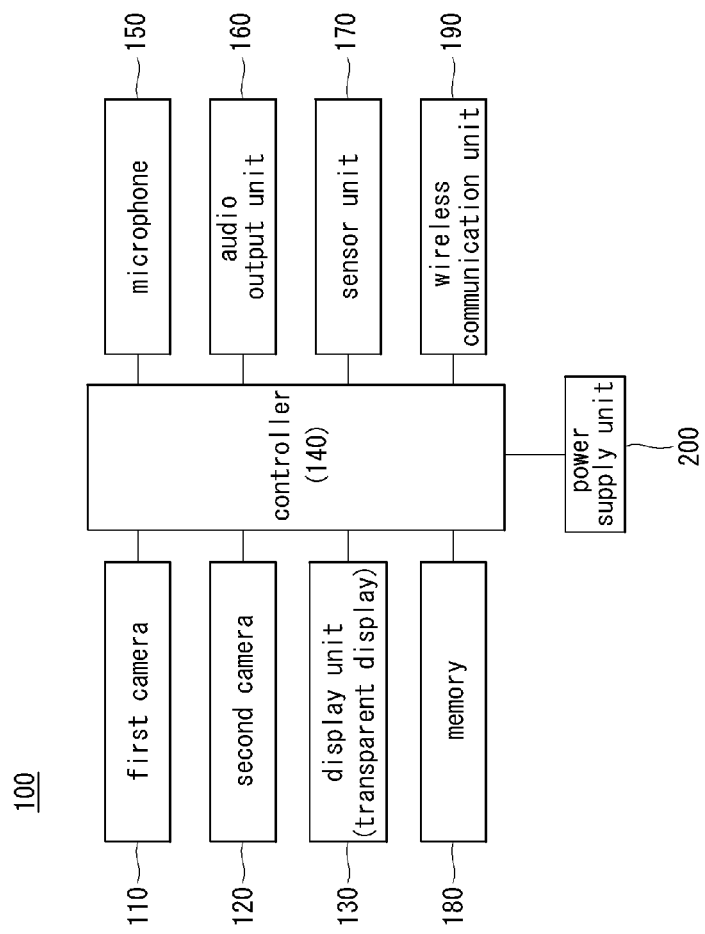
[Fig. 2]
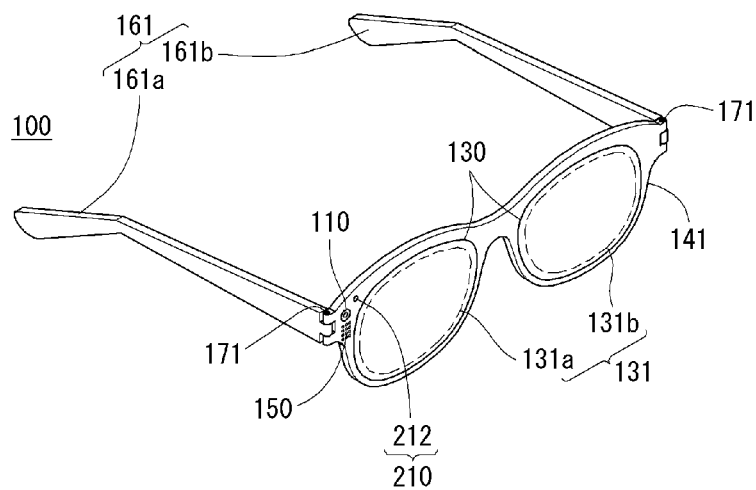

[Fig. 3]
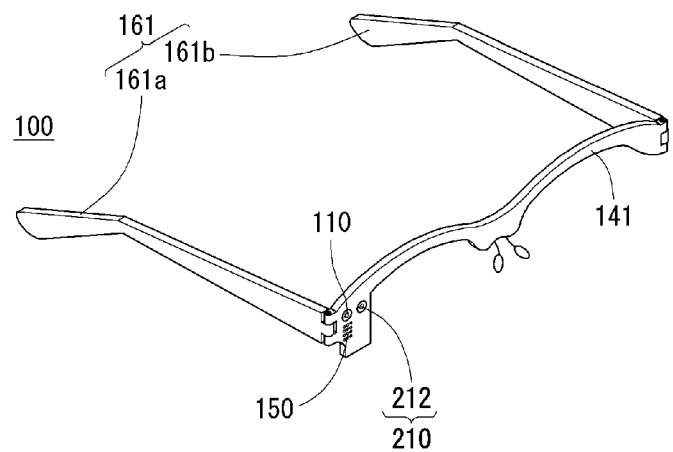
[Fig. 4]
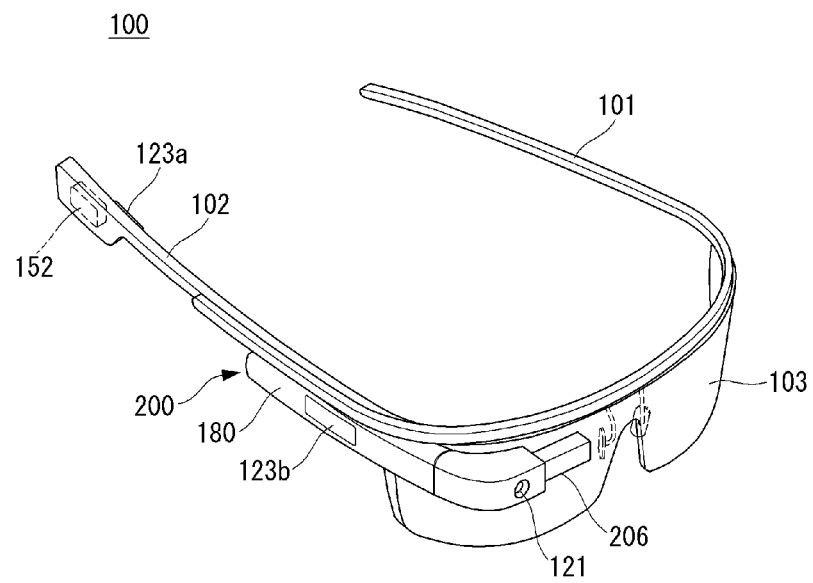

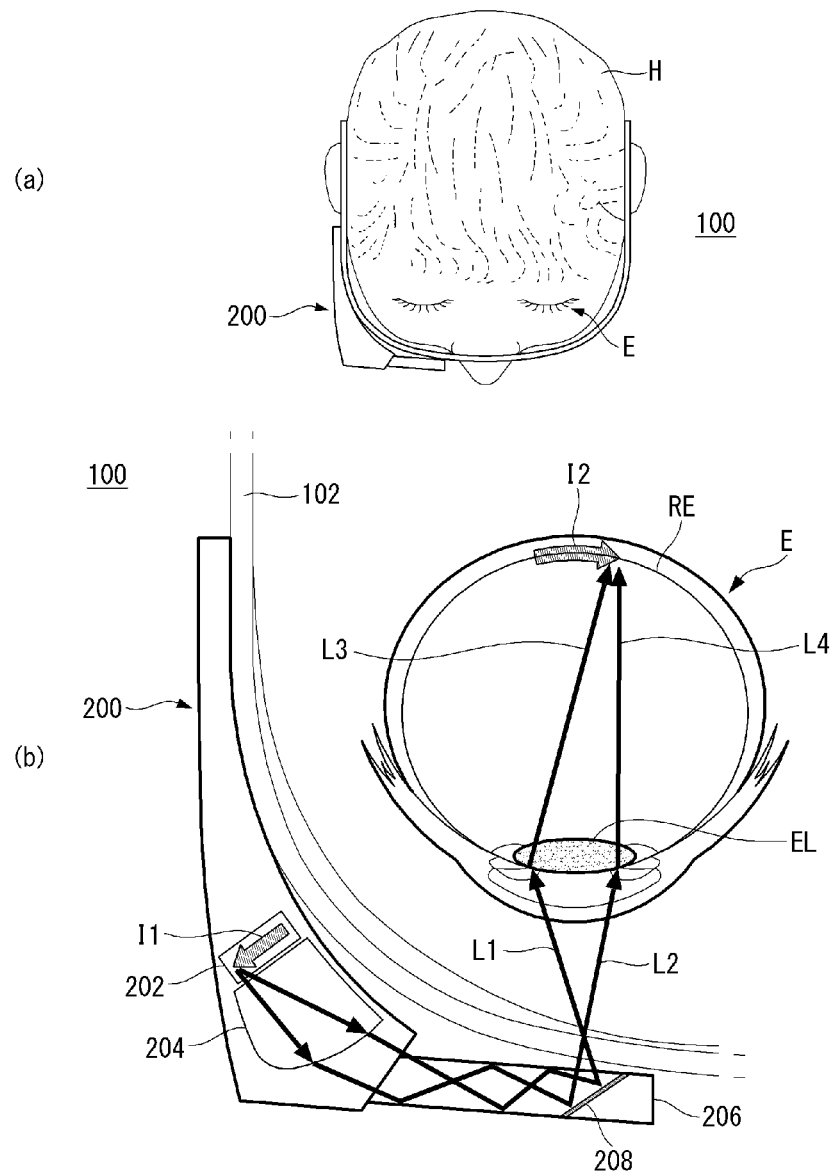

[Fig. 6]
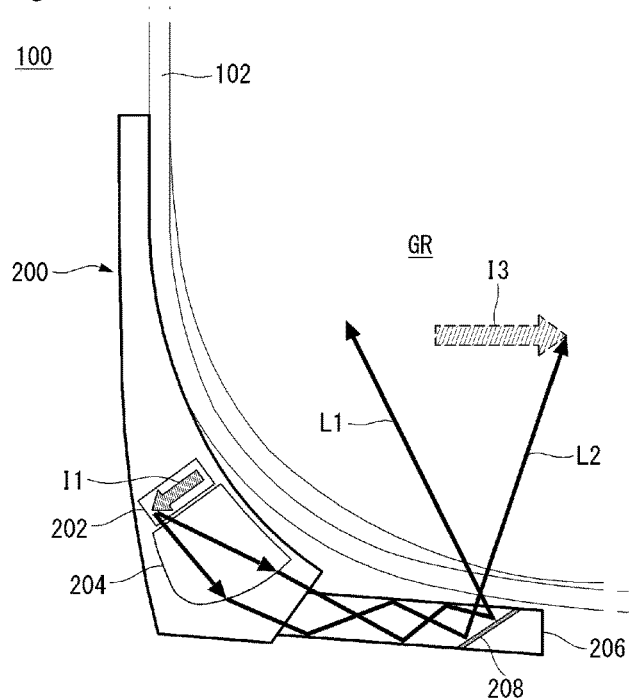
[Fig. 7]
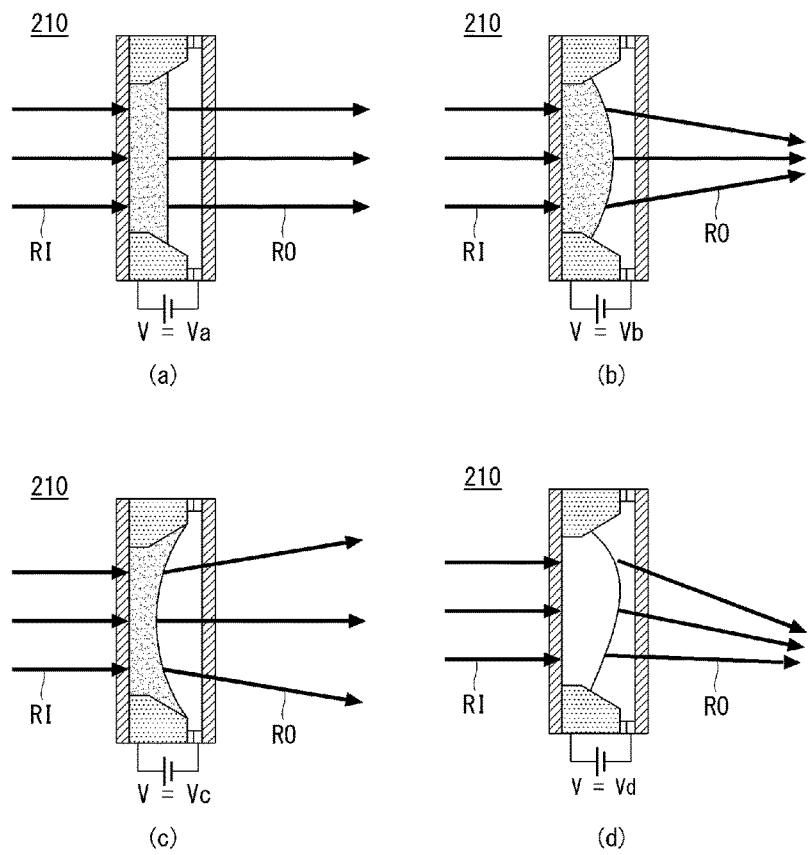

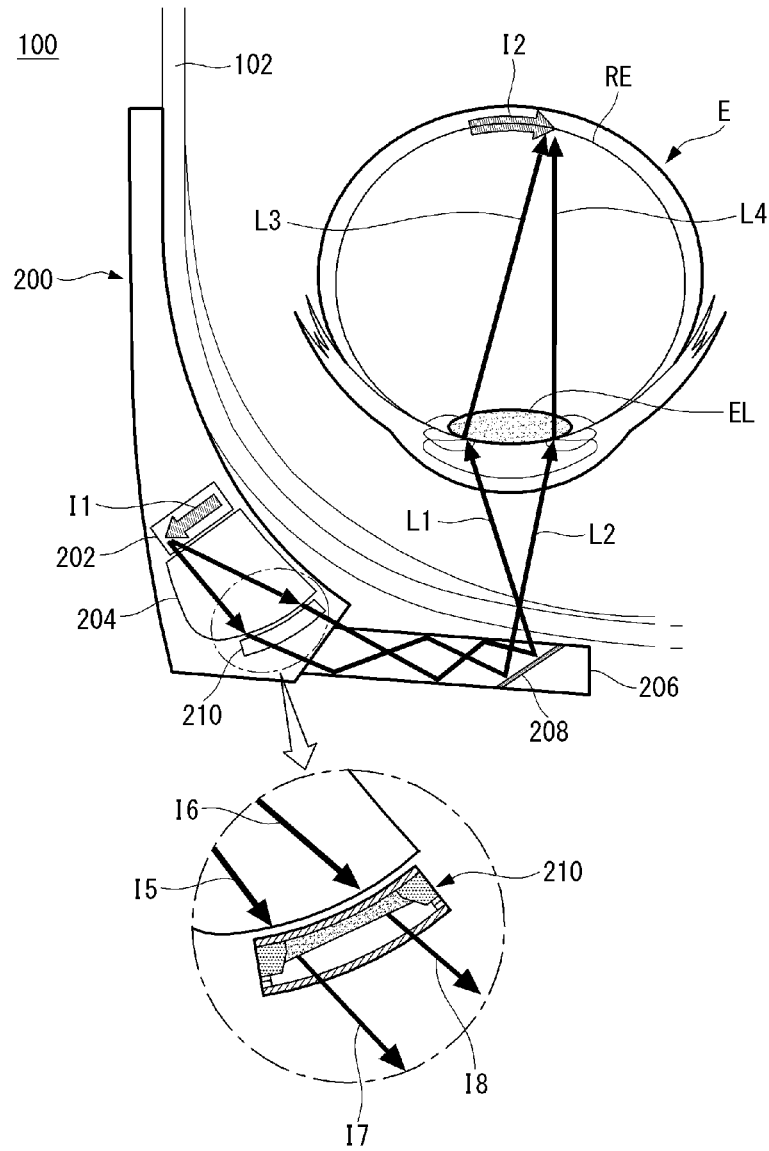

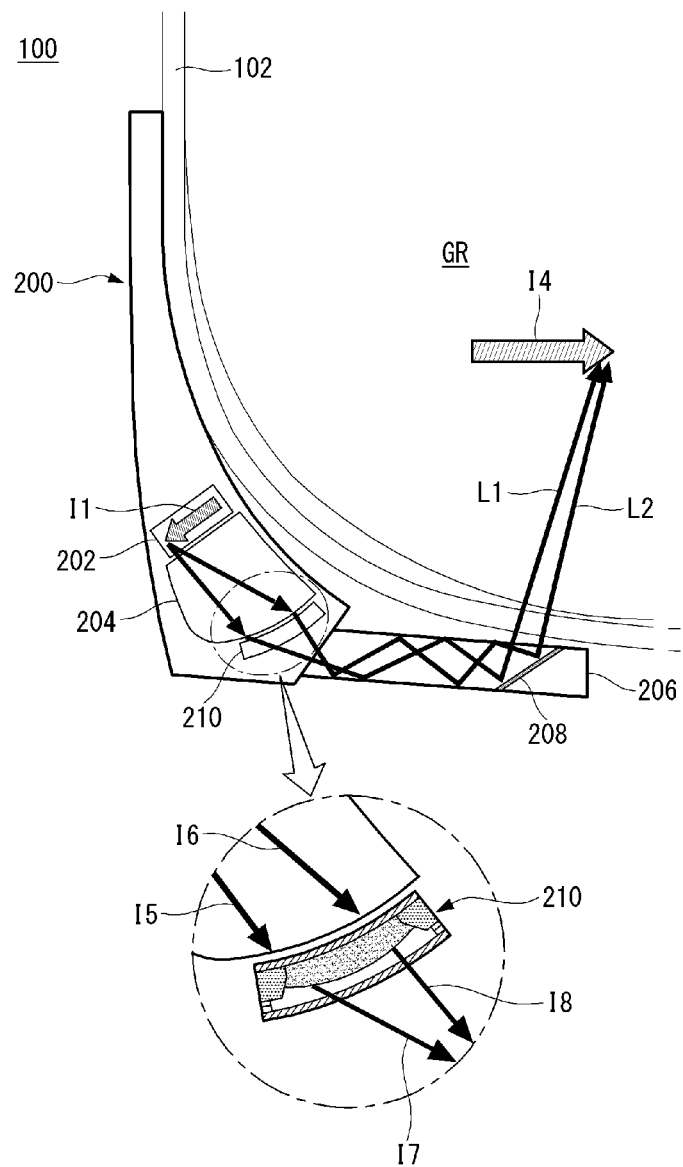
[Fig. 9]

[Fig. 10]
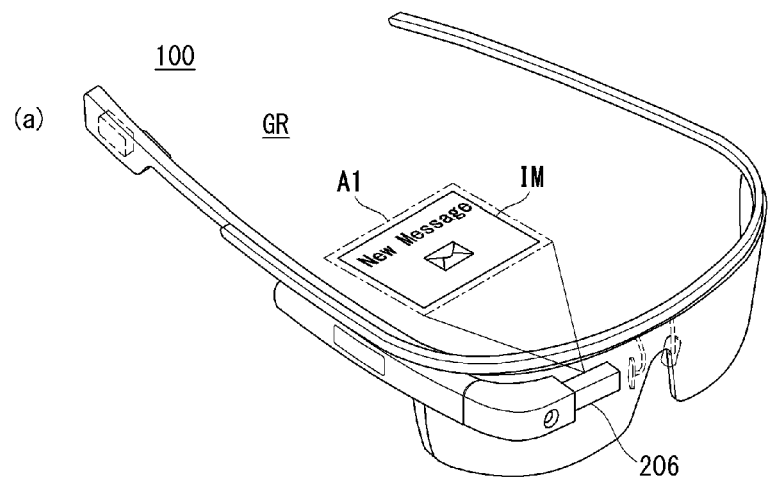
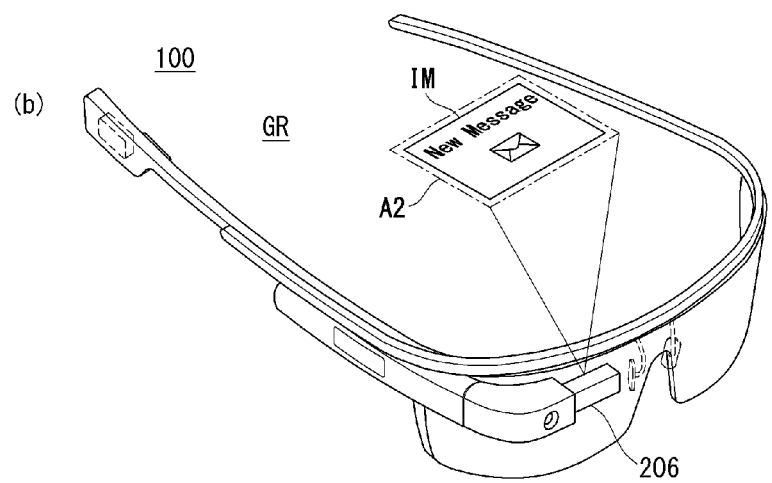

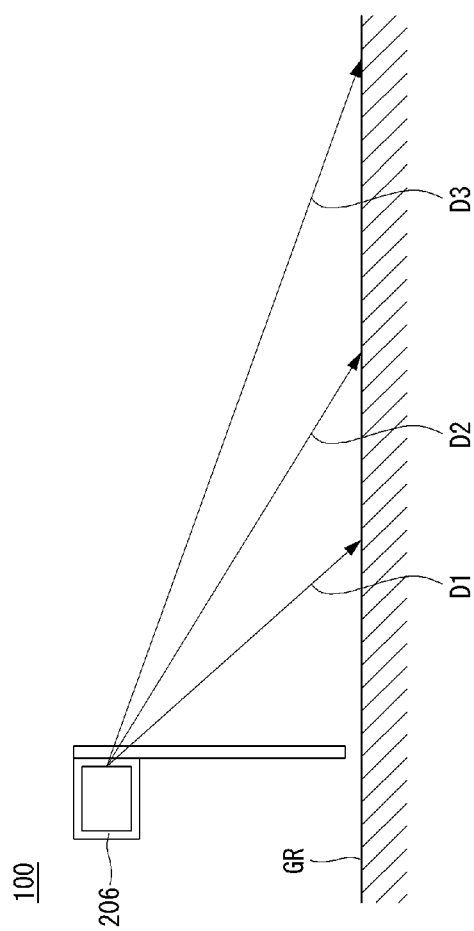
[Fig. 11]

[Fig. 12]
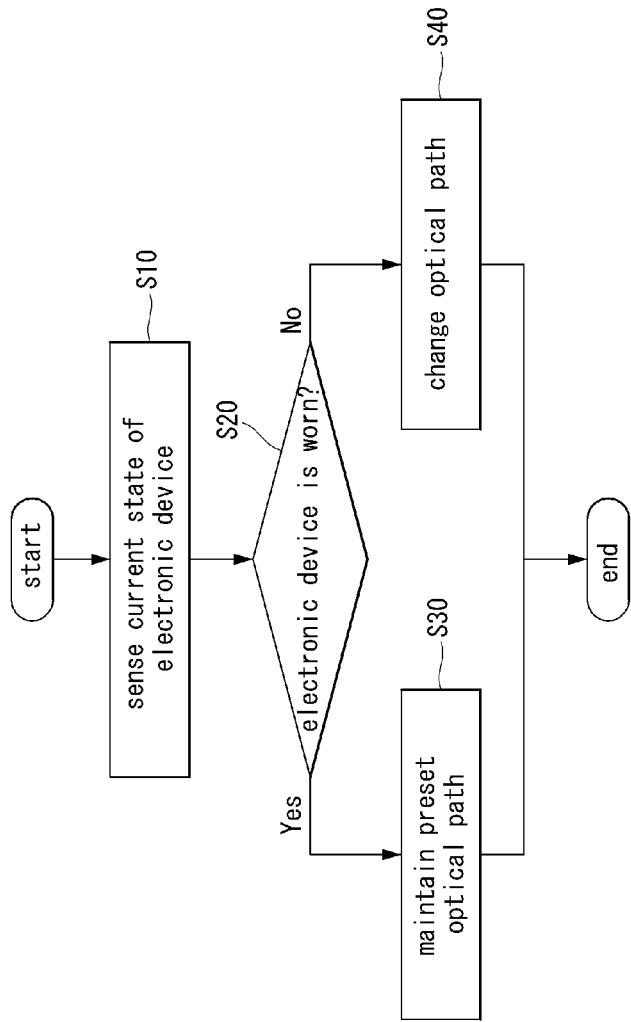
[Fig. 13]
S40
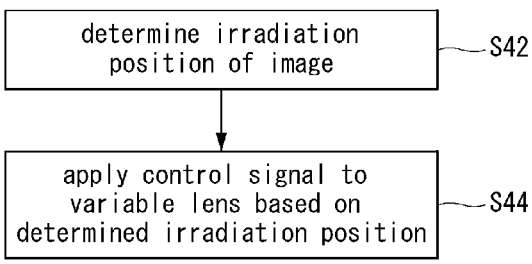

[Fig. 14]
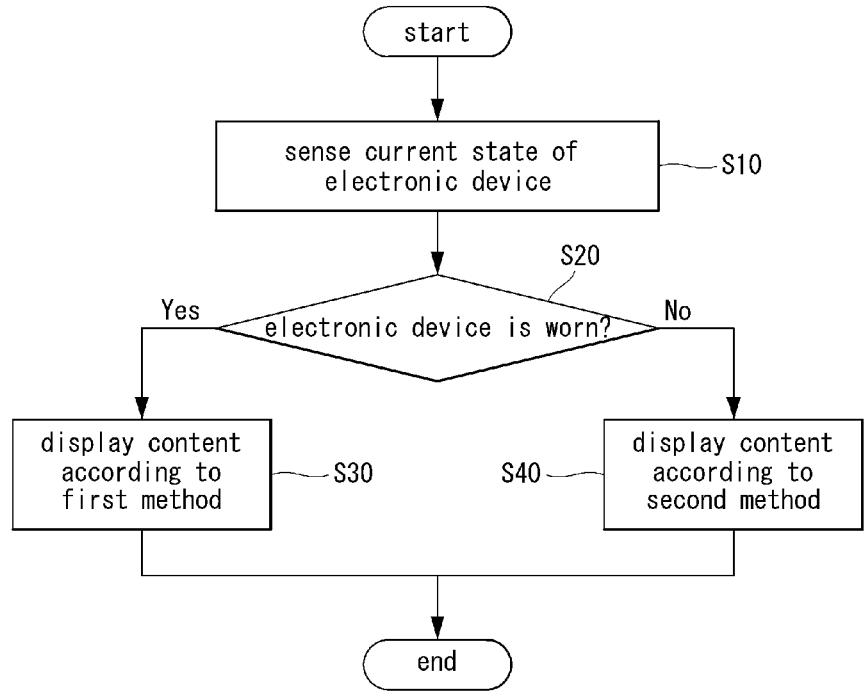
[Fig. 15]
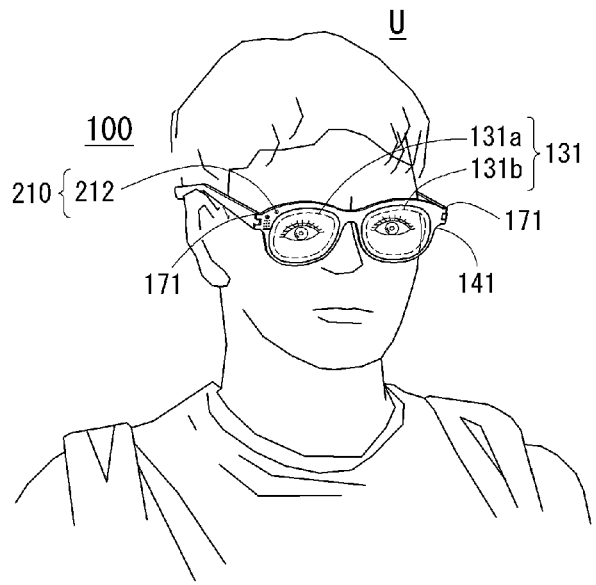

[Fig. 16]
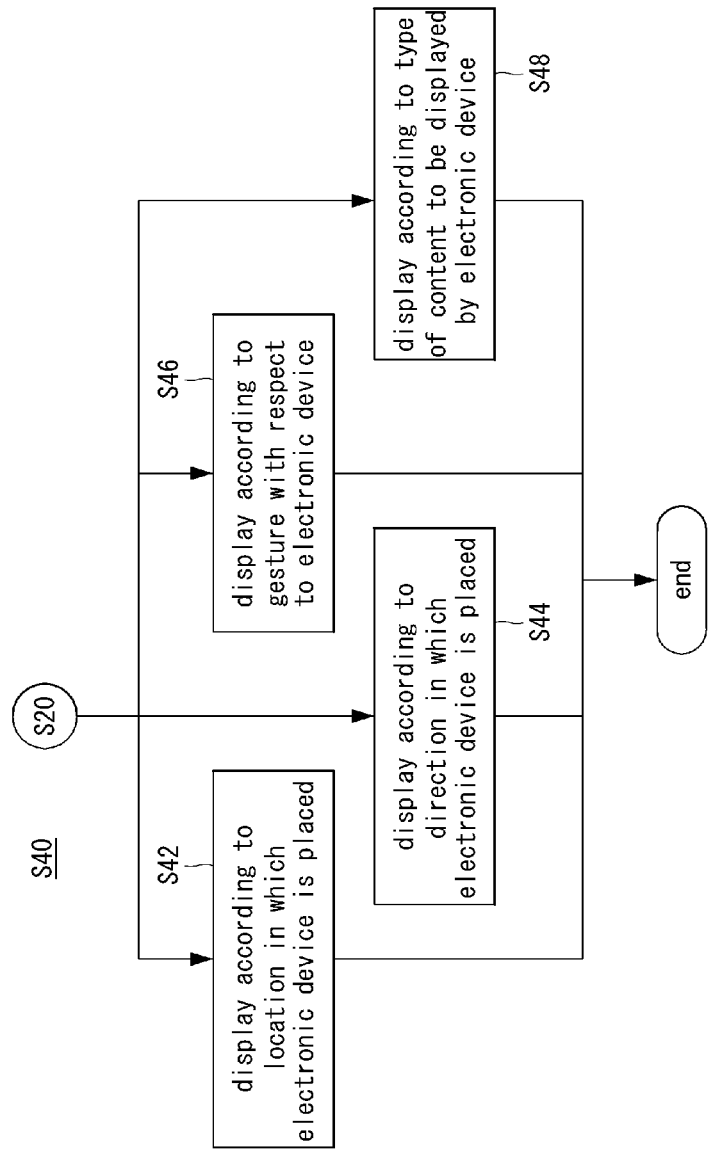

[Fig. 17]
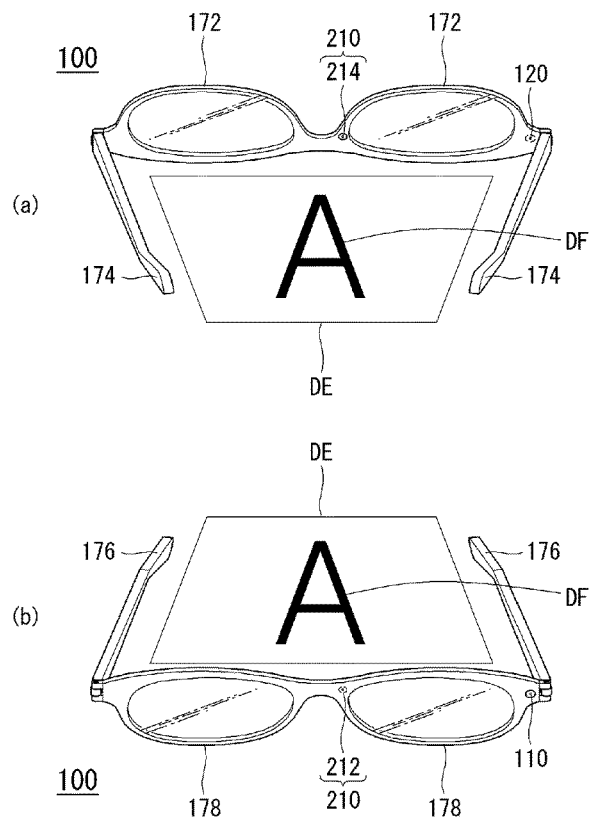
[Fig. 18]
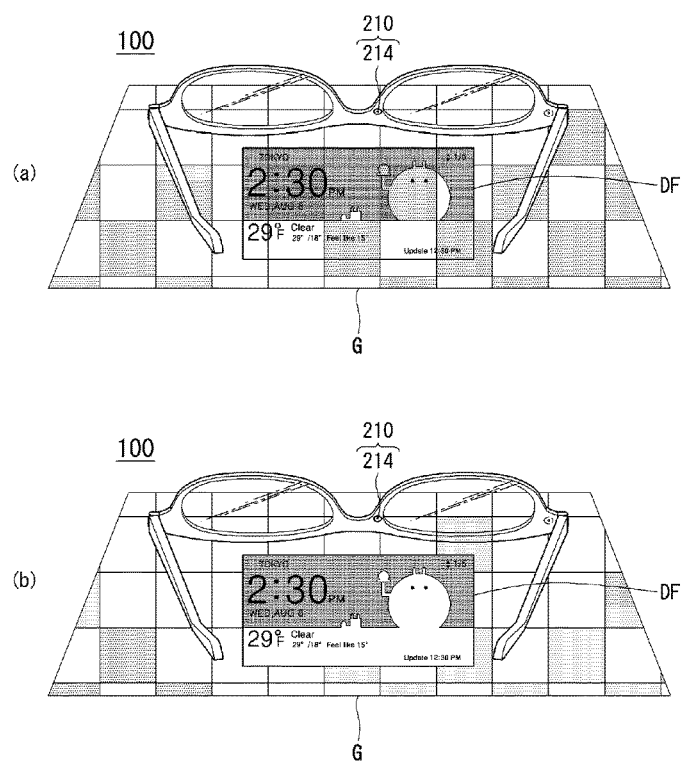

[Fig. 19]
(a) 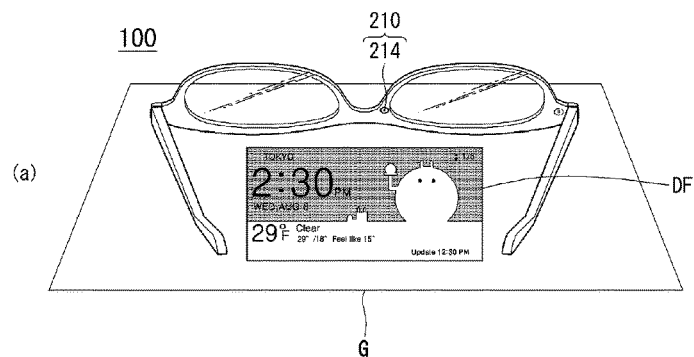
(a) 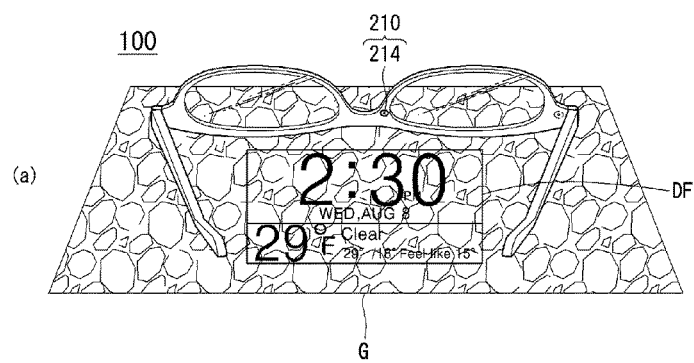
[Fig. 20]
(a) 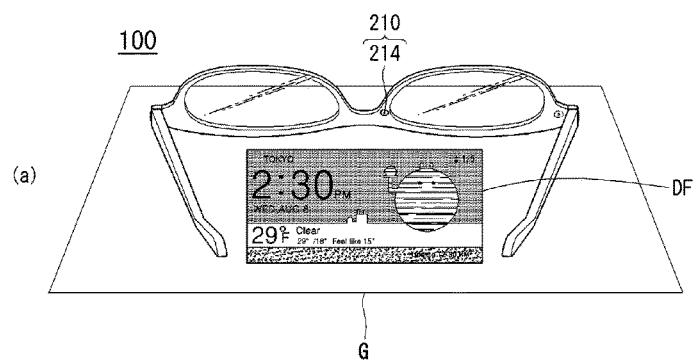
(a) 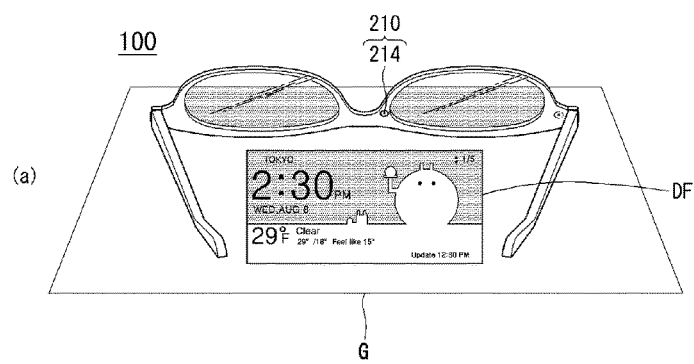

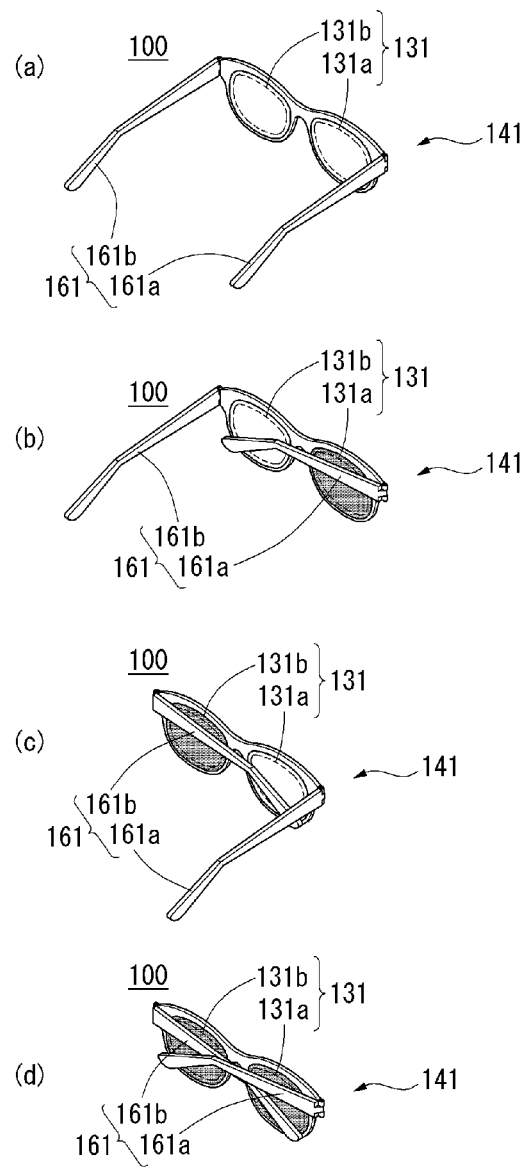
[Fig. 21]

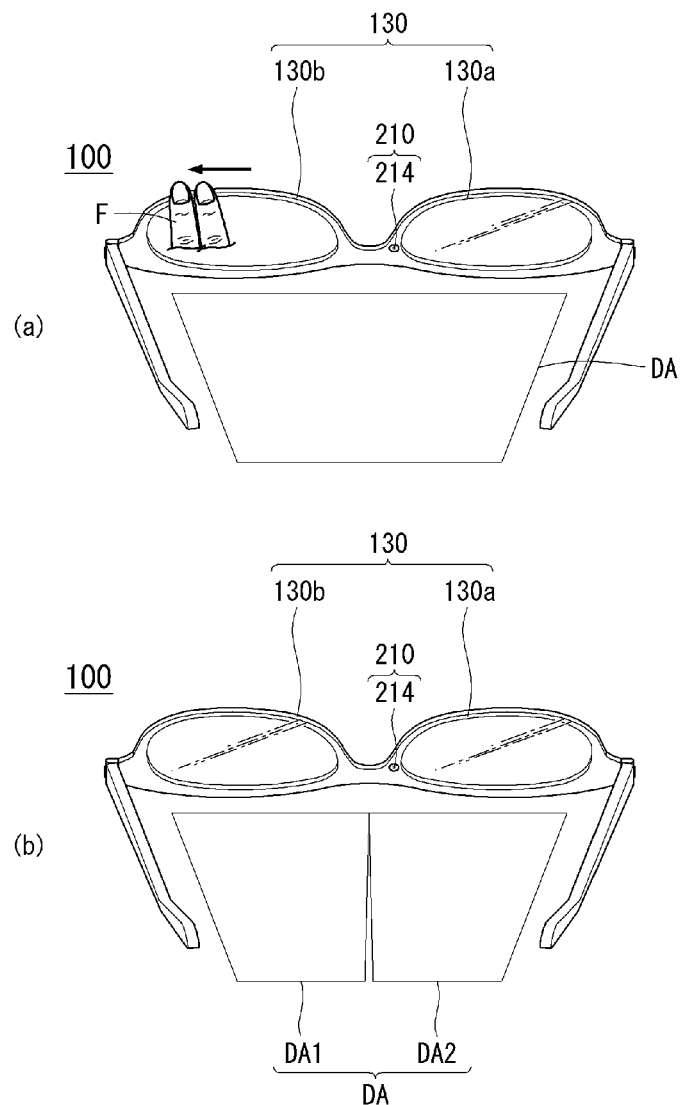
[Fig. 22]

[Fig. 23]
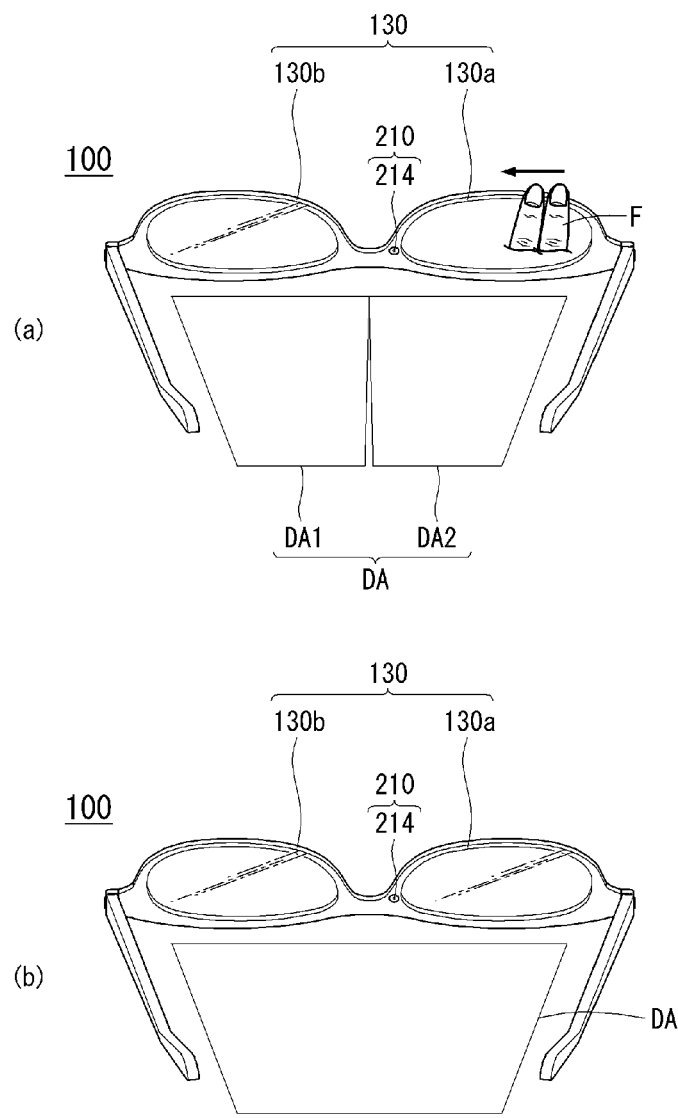

[Fig. 24]
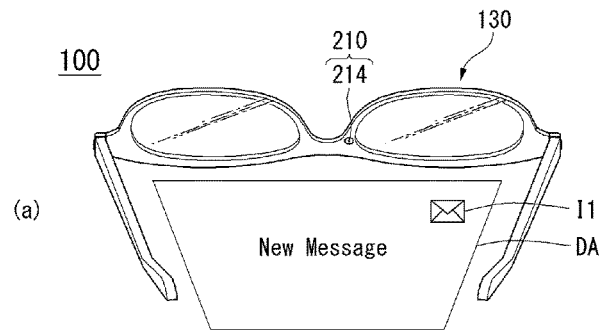
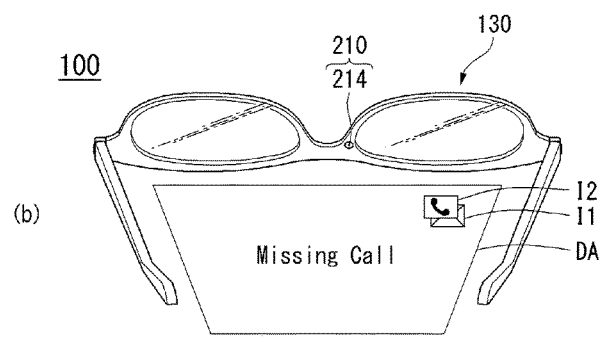
[Fig. 25]
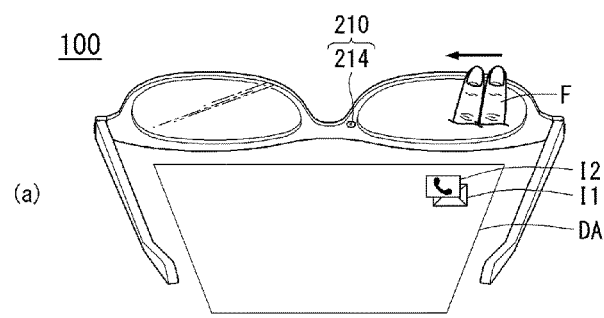
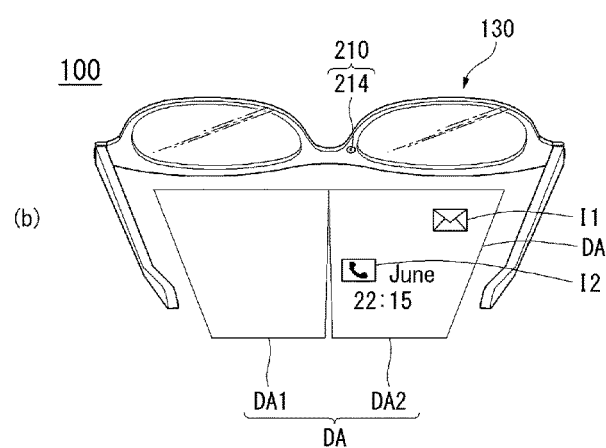

[Fig. 26]
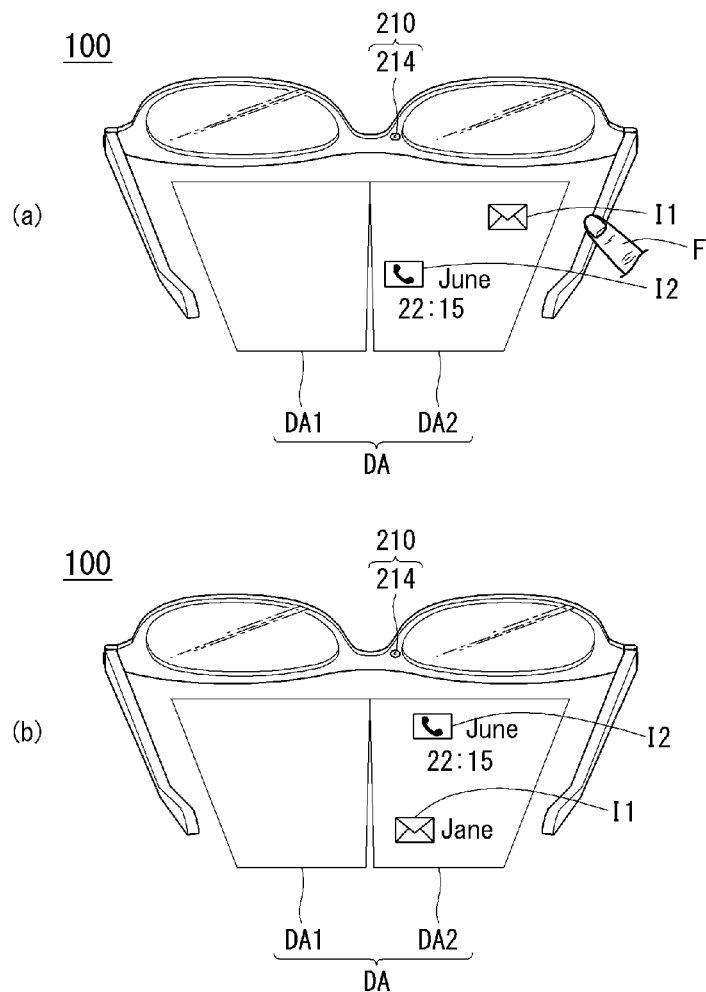

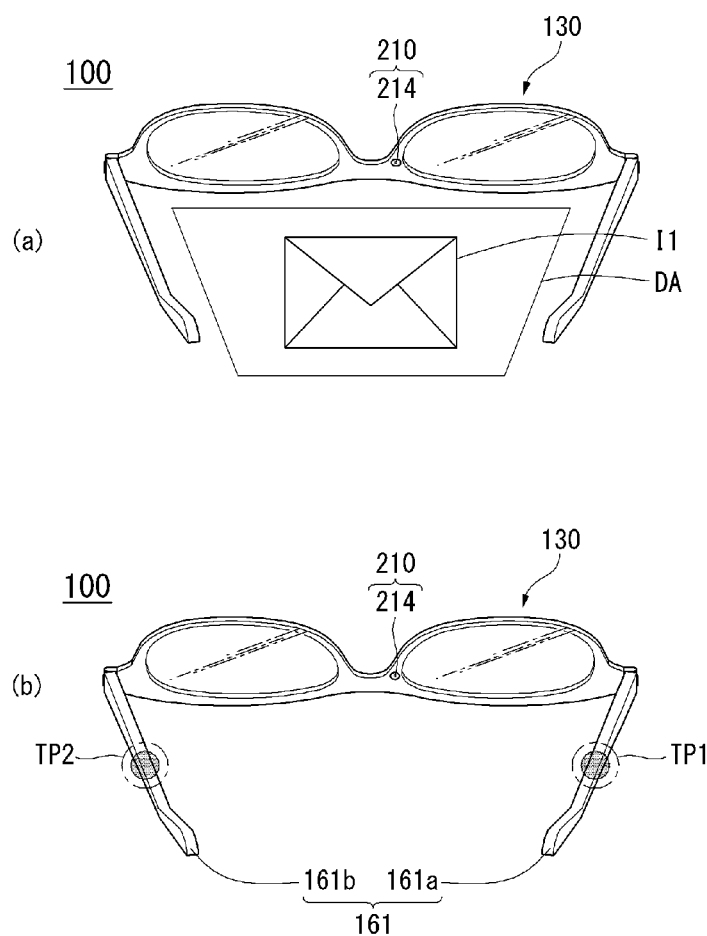

[Fig. 28]
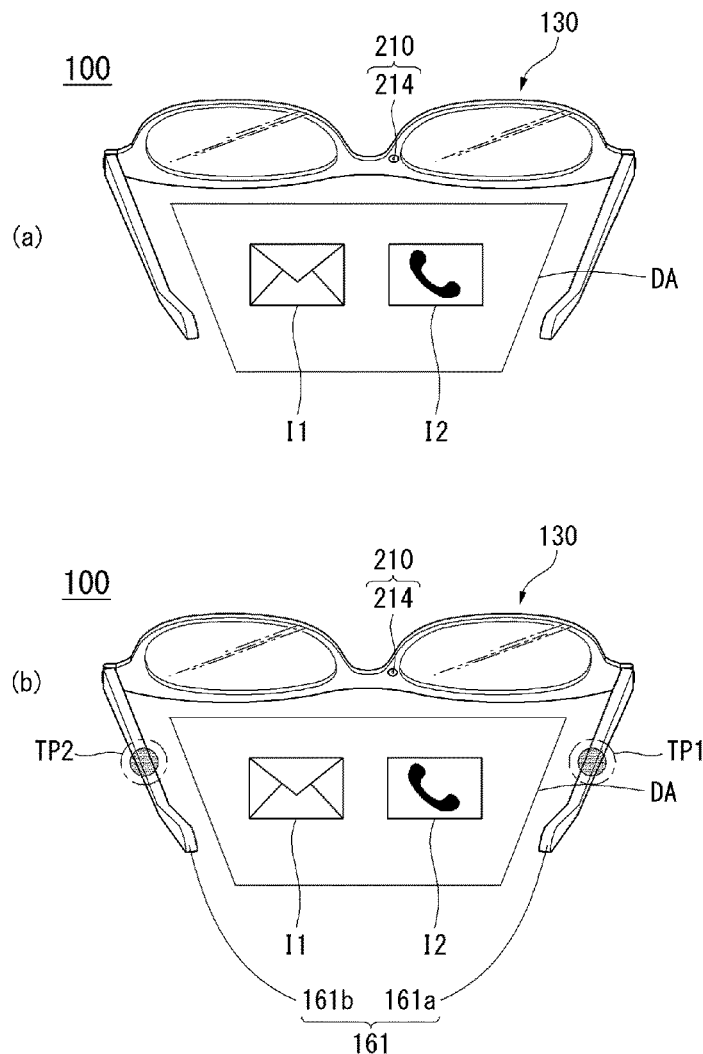
[Fig. 29]
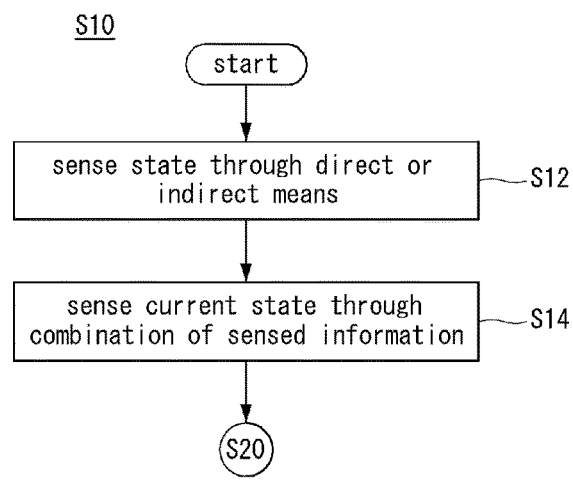

[Fig. 30]
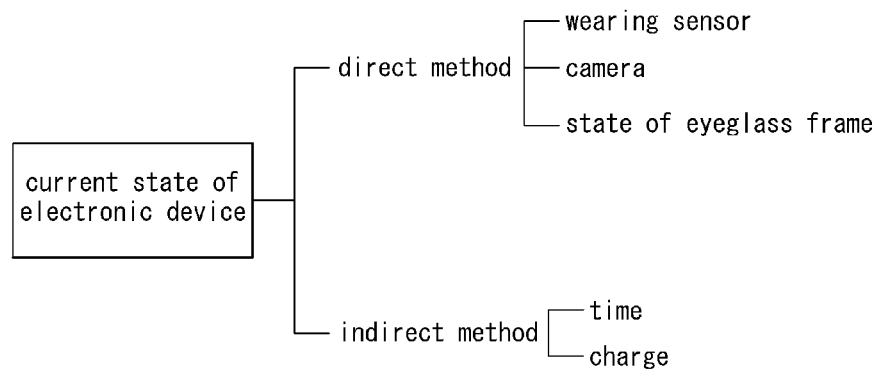
[Fig. 31]
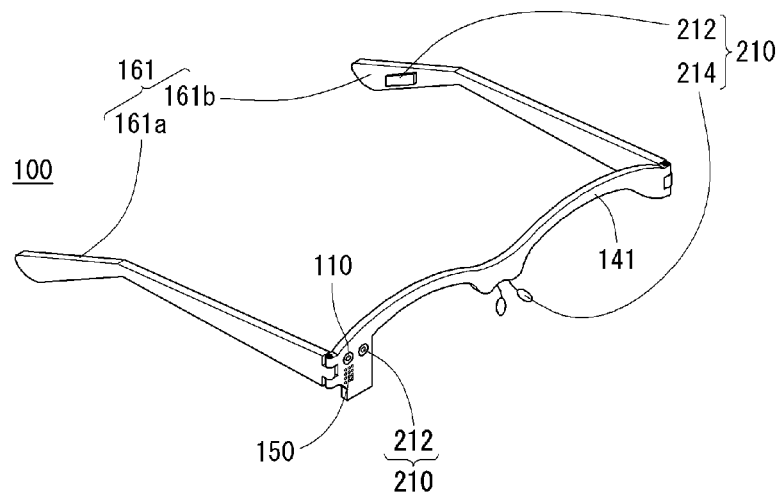
[Fig. 32]
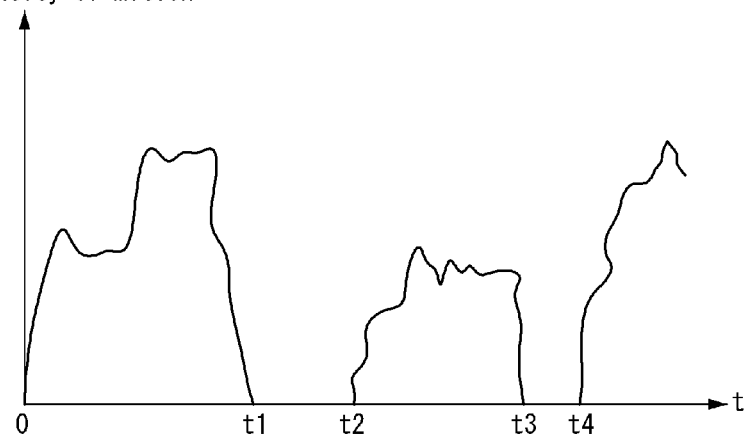

[Fig. 33]
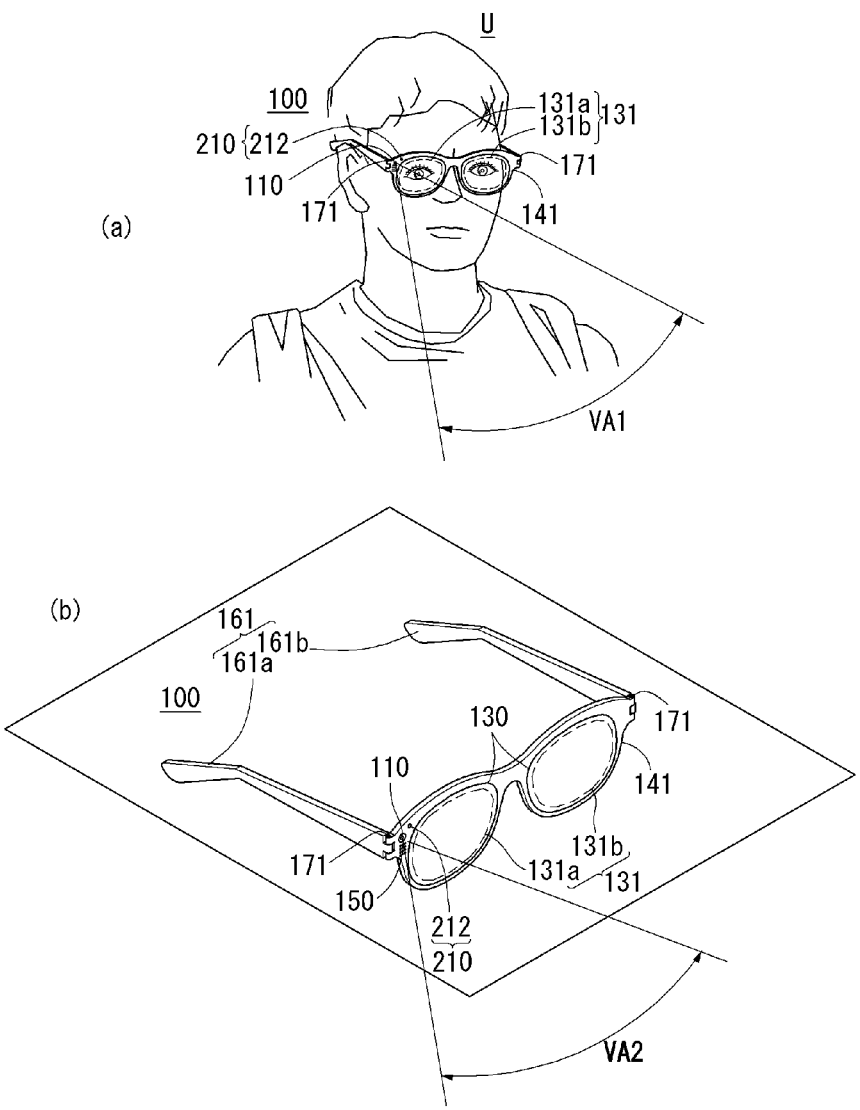

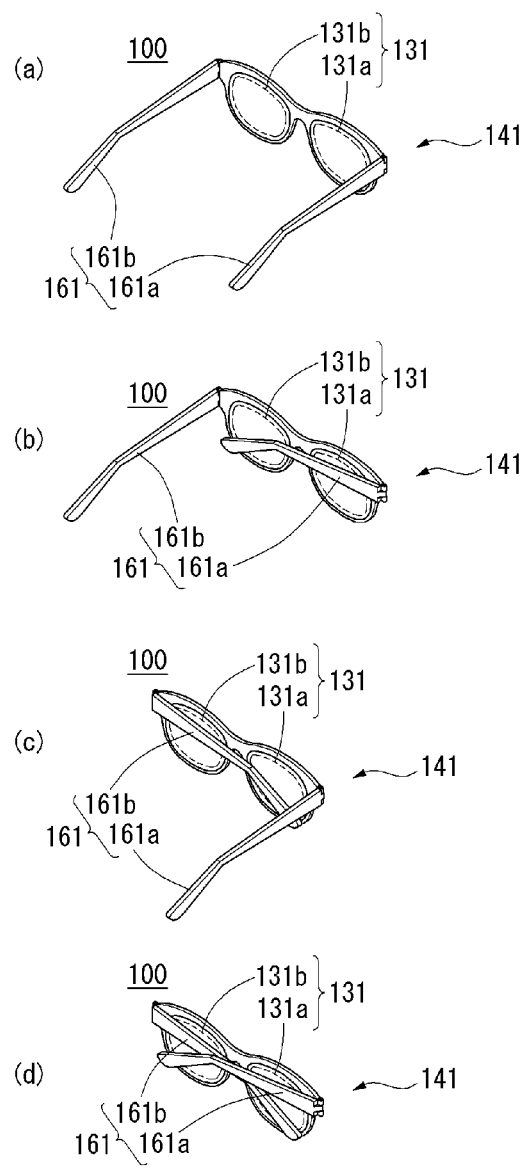
[Fig. 34]

[Fig. 35]
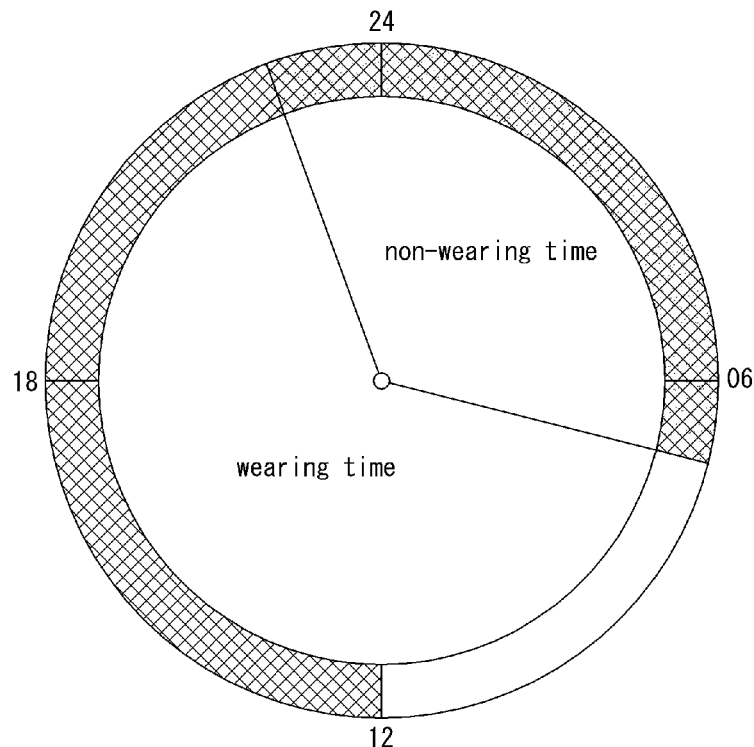
[Fig. 36]
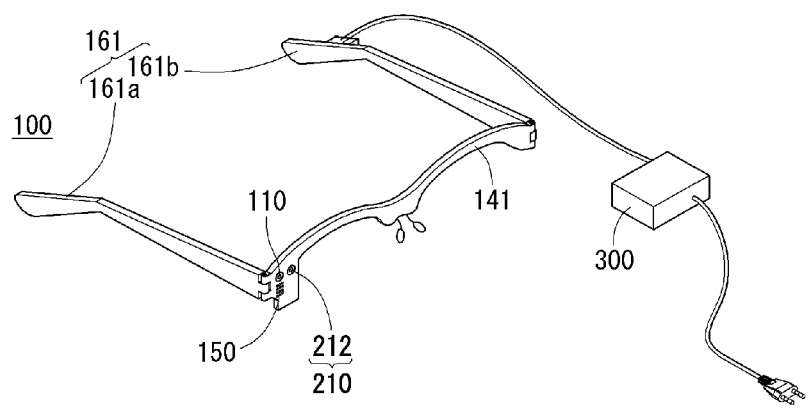

ELECTRONIC DEVICE AND CONTROL METHOD THEREOF

CROSS REFERENCE TO RELATED APPLICATIONS

This application is the National Phase of PCT International Application No. PCT/KR2014/009747, filed on Oct. 16, 2014, which claims priority under 35 U.S.C. 119(a) to Patent Application Nos. 10-2013-0128817, filed in The Republic of Korea on Oct. 28, 2013, 10-2013-0162832, filed in The Republic of Korea on Dec. 24, 2013 and 10-2014-0086972, filed in The Republic of Korea on Jul. 10, 2014, all of which are hereby expressly incorporated by reference into the present application.

TECHNICAL FIELD

The present invention relates to an electronic device and a control method thereof and, more particularly, to an electronic device capable of changing an optical path of light generated in a display by including a variable lens whose refractive index can be changed, and a control method thereof.

BACKGROUND ART

Recently, wearable computing systems that may be directly installed in users' body so as to be used has been actively researched and commercialized. In particular, an electronic device, such as glasses, capable of providing various types of data through glass and providing a cellular phone function, a camera function, and the like, in a state in which users is wearing it has drawn great attention.

DISCLOSURE OF INVENTION

Technical Problem

Therefore, an object of the present invention is to provide an electronic device capable of changing an optical path of light generated in a display by including a variable lens whose refractive index can be changed, and a control method thereof.

Solution to Problem

According to an aspect of the present invention, there is provided an electronic device including: a display; at least one optical lens configured to change an optical path of light generated in the display at a fixed refractive index; a prism configured to reflect the light, which has passed through the at least one optical lens, at least one time to guide the light to a destination point; a variable lens positioned in the optical path of light between the display and the destination point, a refractive index of at least a portion of the variable lens being changed by a control signal to change at least a portion of the optical path of light; and a controller configured to generate the control signal.

According to another aspect of the present invention, there is provided a method for controlling an electronic device, including: sensing whether the electronic device is worn; when the electronic device is worn, maintaining a pre-set optical path and forming an optical path pointing toward eyeballs of a user who wears the electronic device; and when the electronic device is not worn, changing the preset optical path to change the optical path such that an image is displayed on a surface on which the electronic device is placed.

Advantageous Effects of Invention

According to embodiments of the present invention, the mobile terminal has the following advantages.

The electronic device and the control method thereof may include the variable lens whose refractive index can be changed, to thereby change an optical path of light generated in the display.

Additional coverage of applicability of the present invention will become apparent from the following description of the embodiments which is set forth hereinafter. However, various modifications and equivalents within the concept and scope of the present invention may be clearly understood by a person skilled in the art, and detailed descriptions and specific embodiments of the present invention should be understood as being merely illustrative.

BRIEF DESCRIPTION OF DRAWINGS

FIG. 1 is a block diagram of an electronic device according to an embodiment of the present invention.

FIG. 2 is a perspective view of the electronic device of FIG. 1.

FIG. 3 is a perspective view of the electronic device of FIG. 1 according to another embedment of the present invention.

FIG. 4 is a perspective view illustrating an example of a related art glass-type mobile terminal.

FIG. 5 is a view illustrating a principle of forming an image when an electronic device of FIG. 4 is worn.

FIG. 6 is a view illustrating whether or not an image is formed when the electronic device of FIG. 4 is not worn.

FIG. 7 is a view illustrating operations of a variable lens of the electronic device according to an embodiment of the present invention.

FIGS. 8 and 9 are views illustrating display principles of images when the electronic device is worn or is not worn.

FIGS. 10 and 11 are views illustrating an operation when the electronic device according to an embodiment of the present invention is not worn.

FIGS. 12 and 13 are views illustrating operations of the electronic device according to an embodiment of the present invention.

FIG. 14 is a flow chart illustrating a process of operating the electronic device 100 of FIG. 1.

FIG. 15 is a view illustrating a state in which the electronic device of FIG. 1 is worn.

FIG. 16 is a flow chart illustrating a process of displaying content according to the second method in the flow chart of FIG. 14.

FIG. 17 is a view illustrating an embodiment of a display state of the electronic device of FIG. 1.

FIGS. 18 through 20 are views illustrating another embodiment of a display state of the electronic device of FIG. 1.

FIG. 21 is a view illustrating another embodiment of the electronic device of FIG. 1.

FIGS. 22 and 23 are views illustrating manipulation methods of the electronic device of FIG. 1 according to an embodiment of the present invention.

FIGS. 24 through 28 are views illustrating manipulation methods of the electronic device of FIG. 1 according to another embodiment of the present invention.

FIG. 29 is a flow chart illustrating a process of sensing the current state of the electronic device of FIG. 1.

FIG. 30 is a view illustrating methods of sensing the current state of the electronic device of FIG. 1.

FIGS. 31 and 32 are views illustrating a sensing method using sensors in the electronic device of FIG. 1.

FIG. 33 is a view illustrating a sensing method using a camera in the electronic device of FIG. 1.

FIG. 34 is a view illustrating a sensing method according to states of eyeglass frame of the electronic device of FIG. 1.

FIG. 35 is a view illustrating a sensing method based on time in the electronic device of FIG. 1.

FIG. 36 is a view illustrating a sensing method based on charging in the electronic device of FIG. 1.

MODE FOR THE INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted. Also, numbers (e.g., "first", "second," etc.) used in the description of the present disclosure are merely identification symbols for distinguishing one component from another.

Hereinafter, a mobile terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Mobile terminals presented herein may include cellular phones, smart phones, laptop computers, digital broadcast terminals, personal digital assistants (PDAs), portable multimedia players (PMPs), navigators, and the like. However, except for a case in which the components according to an embodiment described in the present disclosure are applied only to mobile terminals, a person skilled in the art will easily understand that the present invention is also applied to stationary terminals such as digital TVs, desktop computers, and the like.

FIG. 1 is a block diagram of an electronic device according to an embodiment of the present invention, and FIG. 2 is a perspective view of the electronic device of FIG. 1.

As illustrated in FIG. 1, the electronic device 100 according to an embodiment of the present invention may include a first camera 110, a second camera 120, glasses 130, a microphone 150, an audio output unit 160, a touch sensor 170, a memory 180, a wireless communication unit 190, a power supply unit 200, and a projector 210.

The electronic device 100 may be a use wearable device. For example, the electronic device 100 may be a wearable device such as glasses that user may wear.

The first camera 110 may be used to capture an external image. The first camera 110 may be rotated at a predetermined angle in four directions as needed. The second camera 120 may be used to capture an image of user's eyes who wears the electronic device 100. The second camera 120 may be rotated at a predetermined angle in four directions as needed.

The first camera 110 may capture an external image of a range exceeding user's visual field. Namely, when a visual field of the user is 'A', a range that may be captured by the first camera 110 may be A+a. For example, an image ranging at 360 degrees with the user as a central figure may be captured through the first camera 110.

A plurality of first cameras 110 may be provided. For example, an appropriate number of first cameras 110 for capturing the front side, the lateral side, and the rear side may be placed in respective positions of the electronic device 100.

The first camera 110 may be a wide angle camera. Namely, the first camera 110 may be a camera capable of capturing an image at an angle greater than that of a general camera. When the first camera is a wide angle camera, an external image in an environment surrounding the user may be extensively obtained.

The glasses 130 may be substantially transparent light general glasses. The user may observe a surrounding environment through the glass 130. Two glasses 130 may be provided to correspond to a left eye and a right eye, or one glass may be provided to correspond to one eye among the left eye and the right eye.

A transparent display region 131 may be positioned in the glass 130 to provide information. The controller 140 may control a general operation of the electronic device 100. Namely, the controller 140 may control the components of the electronic device 100 overall. The controller 104 may analyze an image captured by the first camera 110 and/or the second camera 120. The controller 140 may obtain information regarding a front object upon which the user turns his or her eyes, and provide obtained information through the transparent display region 131 provided in the glasses 130. The controller 140 may analyze the image of the user's eyes captured by the second camera 120, and execute a particular function corresponding to a user's eye gesture recognized according to the analysis result.

The microphone 150 may receive an external audio signal in a phone call mode, a recording mode, a voice recognition mode, and the like, and can process such external audio signal into audio data. The microphone 122 may implement various types of noise canceling (or suppression) algorithms to cancel noise generated in the course of receiving and an external audio signal.

The audio output unit 160 may output audio data. The audio output unit 160 may include a receiver, a speaker, a buzzer, and the like. The audio output unit 160 may output a sound through an earphone jack (not shown). The user may connect an earphone to an earphone jack to listen to an output sound.

The touch sensor 170 may be configured to convert pressure applied to a particular portion by a touch or a change in the capacitance, or the like, generated at a particular portion into an electrical input signal. The touch sensor 170 may be configured to detect even the pressure when a touch is applied, as well as the touched position and area. The touch sensor 170 may be implemented as a proximity sensor. Input data through the touch sensor 170 may be used to perform a particular function of the electronic device 100.

The memory 160 may store programs operations performed by the controller 140, or may temporarily and/or permanently store data (e.g., a phonebook, messages, still images, video, etc.) that are inputted or outputted.

The memory 160 may include at least one type of storage medium including a flash memory, a hard disk, a multimedia card micro type, a card-type memory (e.g., SD or DX memory, etc), a random access memory (RAM), a static random access memory (SRAM), a read-only memory (ROM), an electrically erasable programmable read-only memory (EEPROM), a programmable read-only memory (PROM), a magnetic memory, a magnetic disk, and, an optical disk. The electronic device 100 may be operated in relation to a web storage device that performs the storage function of the memory 160 over the Internet.

The wireless communication unit 190 typically includes one or more modules allowing radio communication between the electronic device 100 and a wireless communication system. For example, the wireless communication unit 190 may include a broadcast receiving module, a mobile communication module, a wireless Internet module, a short-range communication module, a location information module, and the like. However, a selection of wireless communication-related modules that may be included in the wireless communication unit 190 is not limited thereto.

The sensor unit 170 may sense a state of the electronic device 100. For example the sensor unit 170 may sense a direction in which the user who wears the electronic device 100 looks, a level at which the user looks, whether there is a rotation, whether a movement is made forwards or backwards, or the like. The sensor unit 170 may include at least one among a posture sensor, a geomagnetic sensor, and an accelerometer. The controller 140 may sense a state of the electronic device 100 and/or a current state of the user who wears the electronic device 100 based on a result value sensed by at least one sensor.

The power supply unit 200 supplies power required for operations of the components upon receiving external power or internal power under the control of the controller 140.

The projector 210 may project an image. For example, in a particular situation, the projector 210 may project content to an external projection surface in a particular situation. The controller 140 may selectively output an image to at least one among the projector 210 and the transparent display region 131. For example, in a state in which the electronic device 100 is worn, the controller 140 may output an image through the transparent display region 131, and in a state in which the electronic device 100 is not worn, the controller 140 may output an image through the projector 210.

The projector 210 may include a first projector 212 and a second projector (214 in FIG. 17). The first projector 212 and the second projector (214 in FIG. 17) may project images in different directions. For example, the first projector 212 may project an image toward a front surface of the electronic device 100, and the second projector (214 in FIG. 17) may project an image toward a rear surface of the electronic device 100. Which of the first and second projectors 212 and 214 (in FIG. 17) is to be used to project an image may be determined by a control signal from the controller 140 of the electronic device 100. For example, which of the first and second projectors 212 and 214 (in FIG. 17) is to be used to project an image may be determined according to a state of the electronic device 100. An operation of the projector 210 will be described in detail in a pertinent portion.

The electronic device 100 may be divided into a body 141 and eyeglass frames 161.

The body 141 may be a portion forming the front surface of the electronic device 100. The body 141 may include cameras 110 and 120, the glasses 130, the transparent display region 131, and the controller 140.

The transparent display region 131 may be positioned in the each of the glasses 130 or one side of the glasses 130. For example, first and second transparent display regions 131a and 131b may be provided in the glasses 130, respectively.

The eyeglass frames 161 may be coupled to the body 141. The eyeglass frames 161 may rotate on a hinge 171. Namely, the eyeglass frames 161 may rotate on the hinge 171 in a clockwise direction or in a counterclockwise direction. Thus, at least one of first and second eyeglass frames 161a and 161b may rotate in the counterclockwise direction so as to be folded in an inward direction of the body 141 or may rotate in the clockwise direction so as to be folded in an outward direction of the body 141.

FIG. 3 is a perspective view according to another embodiment of the present disclosure.

As illustrated in FIG. 3, the electronic device 100 according to another embodiment of the present disclosure may have a different configuration.

The electronic device 100 may not include the glasses (such as the glasses 130 of FIG. 2). For example, the electronic device 100 may include the body 141 and the eyeglass frames 161 to have a glass type, but glasses (130 of FIG. 2) are not coupled to the body 141.

The electronic device 100 may project an image through the projector 210 such that the user may recognize it. For example, in a state in which the electronic device 100 is worn, the projector 210 may project an image directly to the user's eyeballs. Thus, the glasses (130 of FIG. 2) or the transparent display region (131 of FIG. 2) may not be required. Since the glasses (130 of FIG. 2) are not present, the electronic device 100 may be more naturally worn.

FIG. 4 is a perspective view illustrating an example of a related art glass-type mobile terminal.

The glass-type mobile terminal 100 may be configured to be worn on a human being's head part and may include a frame unit (case, housing, and the like). The frame unit may be formed of a flexible material so as to be easily worn. In FIG. 4, it is illustrated that the frame unit includes a first frame 101 and a second frame 102. In general, the mobile terminal 100 may have characteristics identical or similar to those of the electronic device 100 of FIGS. 1 to 3.

The frame unit is supported by the head part and provides a space in which various components are installed. As illustrated, a control module 180, an audio output module 152, and the like, may be installed in the frame unit. Also, a lens 103 covering at least one among a left eye and a right eye may be detachably installed in the frame unit.

The control module 180 may control various electronic components provided in the mobile terminal 100. The control module 180 may be understood as a component corresponding to the controller 140 described above. In FIG. 4, it is illustrated that the control module 180 is installed on one side of the frame unit on the head part. However, the position of the control module 180 is not limited thereto.

A prism 206 may reflect light generated in a display 202 of FIG. 3 at least one time to guide the light to a destination point. Namely, the prism 206 may serve to substantially change an optical path of light to directly display an image in front of the user's eyes to project an image to the user's eyes.

The image output to the user's eyes through the prism 206 may be displayed to overlap a general visual field. Using such display characteristics, the mobile terminal 100 may provide augmented reality (AR) by superposing a virtual image onto an image of reality or a virtual image to display a single image.

A camera 121 may be disposed to be adjacent to at least one of the left eye and the right eye to capture a front image. Since the camera 121 is positioned to be adjacent to the eyes, the camera 121 may obtain a scene that the user looks, as an image.

In FIG. 4, it is illustrated that the camera 121 is provided in the control module 180, but the present invention is not limited thereto. The camera 121 may be installed in the frame unit, or a plurality of cameras 121 may be provided to obtain a stereoscopic image.

The glass-type mobile terminal 100 may include user input units 123a and 123b manipulated to receive a control command. The user input units 123a and 123b may employ any tactile method that allows the user to perform manipulation such as touch, push, scroll, or the like. In the drawing, it is illustrated that touch input type user input units 123a and 123b are provided in the frame unit and the control module 180, respectively.

Also, the glass-type mobile terminal 100 may include a microphone (not shown) receiving a sound and processing it to electrical audio data and an audio output module 152 outputting a sound. The audio output module 152 may be configured to transmit a sound in a general sound output manner or a bone conduction manner. In a case in which the audio output module 152 is implemented in a bone conduction manner, when the user wears the mobile terminal 100, the audio output module 152 is tightly attached to his or her head part and his or her skull may be vibrated to transmit a sound.

Hereinafter, embodiments related to a control method that may be implemented in the mobile terminal configured as described above will b described with reference to the accompanying drawings. It will be obvious to a person skilled in the art that the present invention is embodied to any other particular form within the scope of the spirit and essential characteristics of the present invention.

FIG. 5 is a view illustrating a principle of forming an image when the electronic device of FIG. 4 is worn.

As illustrated in (a) of FIG. 5, the related art glass-type electronic device 100 may be glasses that are worn on the user's head H. The user may recognize an image generated by the image generating unit 200 of the electronic device 100 through his or her eyes E.

As illustrated in (b) of FIG. 5, light generated in a display 202 may be transmitted to the user through a predetermined path.

The display 202 may display a first image I1. The first image I1 displayed on the display unit 202 may be an image that the image generating unit 202 wants to transmit to the user.

An optical lens 204 may change an optical path of the first image I1 displayed on the display 202. For example, the optical lens 204 may include a least one concave lens and/or convex lens.

A lens of the optical lens 204 may be configured to form an optical path for an image to fall on the retina RE of the user's eye E. Namely, in consideration of the general user's eye lens EL serving as a convex lens, the optical lens 204 may include a combination of at least one concave lens and/or convex lens to allow light that has passed through the eye lens EL to fall on the retina RE to form a second image I2.

The prism 206 may reflect light refracted upon passing through the optical lens 204 at least one time and guide the light to a destination point. Light, which passes through the optical lens 204 and is made incident to the prism 206, may travel along a path in which it is totally internally reflected, to reach a reflector 208.

The reflector 208 may reflect the light, which has traveled along the prism 206, toward the eyeball E. The reflector 208 may be configured as a half mirror.

Light reflected from the reflector 208, which forms first and second optical paths L1 and L2, may point toward the eye lens EL. In consideration of the eye lens EL serving as a convex lens, the first and second optical paths L1 and L2 may have an emanated form. Namely, as the emanated first and second optical paths L1 and L2 pass through the eye lens EL, the first and second optical paths L1 and L2 may be changed into third and fourth optical paths L3 and L4 in a converged form. The converted third and fourth optical paths L3 and L4 may fall on the retina RE to form an image. Namely, the third and fourth optical paths L3 and L4 may generate a second image I2 substantially identical to the first image I1.

FIG. 6 is a view illustrating whether or not an image is formed when the electronic device of FIG. 4 is not worn.

As illustrated, when the electronic device 100 is not worn, a virtual image is created and the user may not recognize the image.

A first image I1 displayed on the display 202 may be transmitted through the optical lens 204, the prism 206, and the reflector 208. Paths of light which has passed through the reflector 208 may be first and second paths L1 and L2. The first and second optical paths L1 and L2 may have an emanated form. The emanated first and second optical paths may be paths on the assumption of the presence of the eye lens EL as mentioned above. Thus, without wearing the electronic device 100, since the eye lens EL is not present within a predetermined distance from the prism 206, a third image I3 of the ground GR may be a virtual image. Thus, a problem may arise in that the third image I3 cannot be visually recognized.

FIG. 7 is a view illustrating operations of a variable lens of the electronic device according to an embodiment of the present invention.

As illustrated, the electronic device according to an embodiment of the present invention may include a variable lens 210.

As illustrated in (a) to (c) of FIG. 7, the variable lens 210 may perform different operations according to voltages and/or currents applied thereto. For example, when a voltage Va is applied, optical paths of incident light RI and output light RO may be identical, and in this case, both the side of the incident light RI of the variable lens 210 and the side of the output light RO of the variable lens 210 are flat.

When the voltage is changed to Vb, the side of the output light RO of the variable lens 210 may be changed to be convex. When the side of the output light RO of the variable lens 210 is changed to be convex, the output light RO may be refracted in a converged direction. Namely, the variable lens 210 may operate like a convex lens.

When the voltage is changed to Vc, the side of the output light RO of the variable lens 210 may be changed to be concave. When the side of the output light RO of the variable lens 210 is changed to be concave, output light RO may be refracted in an emanated direction. Namely, the variable lens 210 may operate like a concave lens.

The voltage Vb may be greater than the voltage Va, and the voltage Vc may be greater than the voltage Vb. Namely, the applied voltages may have a certain relationship.

As illustrated in (d) of FIG. 7, the variable lens 210 may be changed to an atypical state. For example, the variable lens 210 may be changed such that output light RO is refracted in a particular direction.

A substantially transparent liquid may be charged in the variable lens 210. The liquid may be electrolytic. The electrolytic liquid may be changed in shape depending on a voltage applied thereto. When the shape of the liquid is changed, an optical path of light that passes through the liquid may be changed.

An attribute of the variable lens 210 changed according to a change in a voltage may be changed substantially at the same time when a voltage is applied. Thus, the variable lens 210 may be rapidly changed depending on whether the electronic device 100 is worn.

The attribute of the variable lens 210 may be changed by at least one of a change in an applied voltage, a change in an applied current, and a change in an applied control signal. For example, an attribute of the variable lens 210 may be changed from an attribute of a convex lens to an attribute of a concave lens according to a change in an applied voltage. Or, an attribute of the variable lens 210 may be changed by a combination of a voltage, a current, and a control signal.

FIGS. 8 and 9 are views illustrating display principles of images when the electronic device is worn or is not worn.

As illustrated in FIGS. 8 and 9, the electronic device 100 according to an embodiment of the present invention may form an image even in a state in which the electronic device 100 is not worn, as well as in a state in which the electronic device 100 is worn.

As illustrated in FIG. 8, in a state in which the electronic device 100 is worn, a first image I1 may be displayed on the display 202.

The controller 140 may sense whether the electronic device 100 is worn. For example, the controller 140 may sense whether the electronic device 100 is worn through a contact sensor installed in the electronic device 100. Alternatively, the controller 140 may sense whether the electronic device 100 is worn through a proximity sensor and/or a touch sensor installed in the electronic device 100. In this case, the contact sensor, the proximity sensor, and/or the touch sensor may be provided in a nose support in contact with the user's nose, a frame in contact with the head of the user's ear part, and the like. Alternatively, the controller 140 may sense whether the electronic device 100 is worn by sensing a user's movement through an accelerometer.

When the user's movement is sensed for more than a predetermined period of time or when the user's nose in contact with the nose support is sensed through the contact sensor for more than a predetermined period of time, the controller 140 may determine that the user is wearing the electronic device 100.

When it is determined that the electronic device 100 is worn, the controller 140 may change an attribute of the variable lens 210 into a particular state. For example, fifth and sixth optical paths 15 and 16 made incident to the variable lens 210 may be output as seventh and eighth optical paths 17 and 18, without being changed. Namely, the optical paths may not be changed by the variable lens 210.

Since the optical paths are not changed by the variable lens 210, the optical paths may be formed as if there is no variable lens 210. Thus, light that passes through the variable lens 210 and the prism 206 may form the first and second optical paths L1 and L2 and are made incident to the eye lens EL to finally form a second image I2 on the retina RE.

As illustrated in FIG. 9, in a state in which the electronic device 100 is not worn, a first image I2 may be displayed on the display 202.

When it is determined that the electronic device 100 is not worn, the controller 140 may change an attribute of the variable lens 210 accordingly. For example, the controller 140 may apply a control signal to the variable lens 210 so that the variable lens 210 can have an attribute of a convex lens.

When the attribute of the variable lens 210 is changed, seventh and eighth optical paths L7 and L8 which have passed through the variable lens 210 may be changed. For example, the seventh and eighth optical paths L7 and L8 may be changed to a converged form. When the seventh and eighth optical paths L7 and L8 are changed, first and second optical paths L1 and L2 which point toward the ground GR after passing through the prism 206 and the reflector 208 may be changed. For example, the first and second optical paths L1 and L2 may be changed to form a real image.

When the first and second optical paths L1 and L2 are changed to form a real image, a fourth image I4 may be generated on the ground GR. Thus, the user may be able to observe the image by the controller 140 even without wearing the electronic device 100

The fourth image I4 may be changed according to a state of the ground GR, or the like. For example, the controller 140 may change the size of the fourth image I4 according to distances to the ground GR, distances to the user, and the like. Also, the controller 140 may change at least one of a color and a display position of the fourth image I4 according to states of the ground GR.

FIGS. 10 and 11 are views illustrating an operation when the electronic device according to an embodiment of the present invention is not worn.

As illustrated in FIGS. 10 and 11, the electronic device 100 according to an embodiment of the present invention may effectively transmit information to the user even in a state in which the electronic device 100 is not worn and placed on the ground GR.

As illustrated in (a) of FIG. 10, the electronic device 100 may display an image IM in a first region A1. For example, the electronic device 100 may display an image IM indicating reception of a new message in the first region A1.

As illustrated in (b) of FIG. 10, the electronic device 100 may display an image IM in a second region A2. The second region A2 may be a selective display region. For example, when it is determined that it is not desirable to display an image IM in the first region A1, the controller 140 may display the image IM in the second region A2, rather than in the first region A1. Displaying the image IM the first region A1 is not desirable may relate to a color, a material, and the like, of the ground GR corresponding to the first region A1. For example, in a case in which the ground GR corresponding to the first region A1 is too bright or too dark to identify the displayed image IM, the image IM may be displayed in the second region A2, rather than in the first region A1.

As illustrated in FIG. 11, the electronic device 100 according to an embodiment of the present invention may adjust an angle of light emitted from the prism 206. For example, based on the prism 206, light may be irradiated toward the ground GR at various angles in a first direction D1, a second direction D2, a third direction D3, and the like, to form an image. The irradiation angles in the first to third directions D1 to D3 may be adjusted by operating the variable lens 210. Namely, an irradiation direction of an image may be changed by changing the variable lens 210 to an atypical state.

FIGS. 12 and 13 are views illustrating operations of the electronic device according to an embodiment of the present invention.

As illustrated in FIGS. 12 and 13, the controller 140 of the electronic device 100 according to an embodiment of the present invention may sense the current state of the electronic device 100 (S10).

The electronic device 100 may be a wearable device that may be worn on the user's body. In particular, the electronic device 100 may be a glass-type wearable device.

The electronic device 100 may be worn or may not be worn. For example, the electronic device 100 may be placed on the ground for a charging operation.

It is determined whether the electronic device 100 is worn (S20). When it is determined that the electronic device 100 is worn, a preset optical path is maintained (S30).

The optical path may exist as default when the electronic device 100 is worn. Thus, in order to maintain the preset optical path, the controller 140 may apply a control signal to the variable lens 210 such that paths of incident light and output light in the variable lens 210 are not changed.

When the electronic device 100 is not worn, the preset optical path may be changed (S40).

When the electronic device 100 is not worn, if an optical path is maintained like the case in which the electronic device 100 is worn, a virtual image may be created and the user may not be able to recognize an image. Thus, when it is determined that the electronic device 100 is not worn, the controller 140 may apply a control signal to the variable lens 210 to change a path of output light with respect to incident light of the variable lens 210. When the optical path is changed, a real image may fall on the ground.

The changing of an optical path (S40) may include determining an irradiation position of an image (S42).

The controller 140 may determine to which position of the ground light is to be irradiated to form an image. As the irradiation position, a particular position may be set as a default value. For example, a particular position away from the electronic device 100 by a particular distance may have been set to which light is to be irradiated to form an image.

The controller 140 may sense a state of a particular region. For example, the controller 140 may sense a color, a material, or the like, of the particular region by using a camera, or the like. Based on the sensing result, the controller 140 may determine whether a particular region is appropriate for light to be irradiated thereto to form an image. When it is determined that a particular region is not appropriate for light to be irradiated thereto to form an image, the controller 140 may determine other region as an image formation position.

Based on the image formation position, the controller may apply a control signal to the variable lens (S44).

The controller may apply a control signal to the variable lens to change a position to which an image is projected. For example, the controller 140 may change a projection angle to change a position to which an image is projected.

FIG. 14 is a flow chart illustrating a process of operating the electronic device 100 of FIG. 1.

As illustrated in FIG. 14, the controller 140 of the electronic device 100 may sense the current state of the electronic device 100 (S10).

The electronic device 100 may be in various states. Among the various states of the electronic device 100, a state in which the electronic device 100 is worn may be defined as a first state, and a state in which the electronic device 100 is not worn may be defined as a second state.

The current state of the electronic device 100 may be sensed by the sensor unit 170. For example, whether the electronic device 100 is worn may be sensed through a sensor at a point in which the electronic device 100 is in contact with the user's nose, a sensor at a point in which the eyeglass frames 161 are in contact with the user's head, and the like.

The current state of the electronic device 100 may be sensed through a motion recognition sensor. For example, when the electronic device 100 is worn, a motion of the electronic device 100 may be sensed through an accelerometer and/or a geomagnetic sensor.

The current state of the electronic device 100 may include sensing regarding a state of the eyeglass frames 161. For example, whether at least one of the first and second eyeglass frames 161a and 161b is unfolded or folded may be sensed. The state of the eyeglass frames 161 may be sensed through a position sensor positioned at the hinge between the eyeglass frames 161 and the body 141.

The current state of the electronic device 100 may be sensed through at least one of the first and second cameras 110 and 120. For example, whether the user wears the electronic device 100 may be determined by analyzing a captured image.

The controller 140 may determine whether the electronic device 100 is worn (S20), and when the electronic device 100 is worn, the controller 140 may display content according to a first method (S30).

The displaying according to the first method may be a display method optimized for the state in which the electronic device 100 is worn. For example, content may be displayed through the first and second transparent display regions 131a and 13b of the glasses 130 or content may be directly projected to the user's eyeballs through the projector 210.

The controller 140 may determine whether the electronic device 100 is worn (S20), and when the electronic device 100 is not worn, the controller 140 may display content according to a second method (S40).

The displaying according to the second method may be a display method optimized for a state in which the electronic device 100 is not worn.

When the electronic device 100 is not worn, generally, the electronic device 100 may be placed on the ground. When the electronic device 100 is placed on the ground, when content is displayed on the glasses, it may be difficult for the user to recognize the displayed content. Thus, in the second state, the controller 140 may change a display method of content such that user may conveniently recognize the content.

FIG. 15 is a view illustrating a state in which the electronic device of FIG. 1 is worn.

As illustrated in FIG. 15, the electronic device 100 according to an embodiment of the present invention may be worn on the face of the user U. When the electronic device 100 is worn on the user's face, the body 141 may be supported by the user's nose and the first and second eyeglass frames 161a and 161b may be supported by the user's ears.

The user U may observe the exterior through the glasses 130 and the transparent display region 131. For example, information displayed through the transparent display region 131 may be displayed on an external object viewed through the glasses 130, in the form of augment reality.

FIG. 16 is a flow chart illustrating a process of displaying content according to the second method in the flow chart of FIG. 14.

As illustrated in FIG. 16, the controller 140 of the electronic device 100 according to an embodiment of the present invention may display content according to the second method in consideration of various conditions. The electronic device 100 according to an embodiment of the present invention may display content in a manner of projecting the content by using the projector 210 in a state in which the electronic device 100 is not worn. Namely, the content may be projected to the ground, or the like, to allow the user to easily recognize it. In this case, the projected image may be adjusted to reflect a situation of the ground, or the like, so as to be appropriately delivered to the user.

The controller 140 may display content depending on a location where the electronic device 100 is placed (S42).

The location where the electronic device 100 is placed may vary. For example, a material, a color, and the like, of the location where the electronic device 100 is placed may vary.

A state of the ground may be sensed through the sensor unit 170 and/or the cameras 110 and 120. For example, a state of the ground may be sensed by analyzing an image of the ground captured through the cameras 110 and 120.

When a material of the ground is smooth, rather than being rough, so a projected image is easily recognized, the controller 140 may display a large amount of information. For example, when a material of the ground is appropriate for an image to be projected thereto, the controller 140 may use a smaller font. When a material of the ground is appropriate for an image to be projected thereto, the controller 140 may use more various colors.

When a color of the ground is bright, the controller 140 may project an image more brightly. When a color of the ground is dark, the controller 140 may project an image relatively darkly.

The controller 140 may display content depending on a direction in which the electronic device 100 is placed (S44).

The electronic device 100 may be placed such that a front surface or a rear surface thereof faces the user. Alternatively, the electronic device 100 may be placed such that a lower surface or an upper surface thereof is in contact with the ground. Based on the result of sensing through the sensor unit 170 and/or the cameras 110 and 120, the controller 140 may determine a direction in which the electronic device 100 is placed. The controller 140 may display an optimized image depending on the direction in which the electronic device 100 is placed.

The controller 1400 may display content according to gestures with respect to the electronic device 100 (S46).

The user may make a particular gesture in front of the cameras 110 and 120 of the electronic device 100 or may make a gesture of being in direct contact with a particular portion of the electronic device 100. In response to the direct or indirect gesture with respect to the electronic device 100, the controller 140 may change a method of displaying content.

The controller 140 may display content differently according to types of content to be displayed through the electronic device 100 (S48).

Content to be displayed through the electronic device 100 may vary. For example, a received message, a received call, various text, various video, and the like, may be variously displayed through the electronic device 100. Content to be displayed through the electronic device 100 may be displayed in different manners according to attributes of the content. Namely, content may be displayed in a manner optimized therefor.

FIG. 17 is a view illustrating an embodiment of a display state of the electronic device of FIG. 1.

As illustrated in FIG. 17, the electronic device 100 according to an embodiment of the present invention may display content DF in different manners according to directions in which the electronic device 100 is placed.

As illustrated in (a) of FIG. 17, in the second state in which the electronic device 100 is not worn, a lower portion 172 of the body of the electronic device 100 and/or a lower portion 174 of the eyeglass frames 161 may be in contact with the ground.

The electronic device 100 may include a position sensor and/or a geomagnetic sensor. The controller 140 of the electronic device 100 may sense a state in which the electronic device 100 is placed through the position sensor and/or the geomagnetic sensor.

A pressure sensor may be positioned in the lower portion 172 of the body of the electronic device 100 and/or the lower portion 174 of the eyeglass frames 161. Namely, a state in which the lower portion 172 of the body of the electronic device 100 and/or the lower portion 174 of the eyeglass frames 161 are in contact with the ground may be sensed through the pressure sensor.

The controller 140 may display content DF to correspond to a direction of the user. For example, a location of the user may be sensed by analyzing an image captured through the cameras 110 and 120. When the location of the user is sensed, the controller 140 may project content DF to a projection surface DE by using the projector. For example, the controller 140 may display the content DF by using the second projector 214 corresponding to the direction in which the user is located.

As illustrated in (b) of FIG. 17, in the second state in which the electronic device 100 is not worn, an upper portion 178 of the body of the electronic device 100 and/or an upper portion 176 of the eyeglass frames 161 may be in contact with the ground.

The controller 140 may determine a direction in which content DF is to be displayed. For example, the controller 140 may determine a direction appropriate for displaying the content DF among a direction of the front side and a direction of the rear side of the electronic device 100 by using the cameras 110 and 120, and the like.

When the direction is determined, the controller 140 may display the content DF such that it is viewed properly in the direction in which the user views it. Namely, the controller 140 may display the content DF such that the direction in which the user views the content DF and a vertical direction of the content DF are aligned. Thus, orientation of the content viewed by the user may be uniform, regardless of direction in which the electronic device 100 is placed. Namely, the controller 140 may project content such that the orientation of the content is uniform with respect to the direction of the user's eyes, regardless of direction in which the electronic device 100 is placed.

FIGS. 18 through 20 are views illustrating another embodiment of a display state of the electronic device of FIG. 1.

As illustrated in FIGS. 18 through 20, the controller 140 of the electronic device 100 according to another embodiment of the present invention may change a display state of content DF according to states of the ground G such as a color and/or a material of the ground G.

As illustrated in (a) of FIG. 18, the ground G on which the electronic device 100 is placed may have various colors. Thus, if the various colors of the ground G are not considered, a situation in which some portions of the content DF are easily recognized while others are not may occur.

As illustrated in (b) of FIG. 18, the controller 140 may change a method of displaying the content DF according to the states of the ground G. For example, when the ground G has various colors, the controller 140 may display the content DF by correcting brightness and/or colors thereof based on a dark color or a bright color. By correcting the colors, recognition of the displayed content DF may be increased.

As illustrated in (a) of FIG. 19, the ground G may be appropriate for an image to be projected thereto. For example, the ground G may be formed of a smooth material to allow an image projected thereto to be easily recognized. When the ground G is in a state of facilitating recognition of an image, the controller 140 may display the content DF minutely.

As illustrated in (b) of FIG. 19, the ground G may not be appropriate for an image to be projected thereto. In a case in which the ground is uneven, or the like, so it is not appropriate for the content DF to be displayed thereon, the controller 140 may change a display state of the content DF. For example, the controller 140 may perform at least one among an operation of increasing the font of the content DF, an operation of adjusting an amount and/or type of information of the content DF by deleting information having low importance, and an operation of simplifying coloration. Even with the same information, the controller 140 may display the content DF differently according to states of the ground G to increase user recognition with respect to the content DF.

As illustrated in FIG. 20, the controller 140 may display content DF appropriately depending on brightness of the ground G.

As illustrated in (a) of FIG. 20, the ground G may have a bright color. When the ground G has a bright color, the controller 140 may display the content DF by using various light and shade and/or colors.

As illustrated in (b) of FIG. 20, the ground G may have a dark color. When the ground G has a dark color, the controller 140 may display content DF by using simple light and shade and/or colors. Thus, user recognition with respect to the content DF may be increased.

FIG. 21 is a view illustrating another embodiment of the electronic device of FIG. 1.

As illustrated in FIG. 21, the electronic device 100 according to another embodiment of the present invention may change displaying of the glasses 130 according to states of the eyeglass frames 161.

As illustrated in (a) of FIG. 21, the eyeglass frames 161 may be unfolded. Namely, both the first and second eyeglass frames 161*a* and 161*b* may be positioned in a direction of about 90 degrees with respect to the body 141. When both the first and second eyeglass frames 161*a* and 161*b* are unfolded, the controller 140 may determine that the user uses the glasses 130. Thus, the controller 140 may activate the glasses 130. For example, the controller 140 may display an image through the transparent display region 131.

As illustrated in (b) of FIG. 21, one of the eyeglass frames 161 may be folded. For example, the first eyeglass frame 161*a* may be folded in a direction toward the body 141, and the second eyeglass frame 161*b* may be unfolded at about 90-degree direction with respect to the body 141. In consideration of the fact that the first eyeglass frame 161*a* is folded, the controller 140 may deactivate the glass 130 corresponding to the first eyeglass frame 161*a*. For example, the controller 140 may deactivate the first transparent display region 131*a* of the first eyeglass frame 161*a* side.

As illustrated in (c) of FIG. 21, when the second eyeglass frame 161*b* is folded, the controller 140 may deactivate the second eyeglass frame 161*b* corresponding thereto.

As illustrated in (d) of FIG. 21, when both the first and second eyeglass frames 161*a* and 161*b* are folded, the controller 140 may deactivate both glasses 130. Namely, when both the eyeglass frames 161 are folded, the controller 140 may determine that the user has no intention to use the electronic device 100. Thus, when both the eyeglass frames 161 are folded or when a predetermined period of time has elapsed since the eyeglass frames 161 were folded, the controller 140 may deactivate the glasses 130. For example, the controller 140 may stop displaying of an image through the transparent display region 131.

FIGS. 22 and 23 are views illustrating manipulation methods of the electronic device of FIG. 1 according to an embodiment of the present invention.

As illustrated in FIGS. 22 and 23, the electronic device 100 according to an embodiment of the present invention may adjust a display region DA in response to a user's gesture.

As illustrated in (a) of FIG. 22, the display region DA may be a single region. Content may be displayed in the entirety of the single region DA.

The controller 140 may receive a particular gesture from the user. For example, the controller 140 may receive a gesture of touching the second glass 130*b*, a particular glass 130, or a gesture of moving the user's fingers in a touched state in a predetermined direction.

As illustrated in (b) of FIG. 22, when a particular gesture is received from the user, the controller 140 may divide the display region DA. For example, the controller 140 may divide the display region DA into a first display region DA1 corresponding to the first glass 130*a* and a second display region DA2 corresponding to the second glass 130*b*. Namely, the controller 140 may change the width and/or the number of display regions DA in which content is to be displayed according to attributes of content and/or a user input.

As illustrated in (a) of FIG. 23, the controller 140 may receive another gesture from the user. For example, the controller 140 may receive a gesture of touching the first glass 130*a* or a gesture of moving the user's fingers in a touched state in a predetermined direction.

As illustrated in (b) of FIG. 23, the controller 140 may merge divided display regions into a display region DA in response to a user's touch input.

FIGS. 24 through 28 are views illustrating manipulation methods of the electronic device of FIG. 1 according to another embodiment of the present invention.

As illustrated in FIGS. 24 through 28, the electronic device 100 according to an embodiment of the present invention may effectively display content in a projected region in various situations.

As illustrated in (a) of FIG. 24, in the second state in which the electronic device 100 is not worn, a new message may be received. When the controller 140 senses that the electronic device 100 is in the second state, the controller 140 may display the reception of the message in the display region DA. Namely, assuming that the user is away from the electronic device 100 by a predetermined distance, the controller 140 may display the reception of the message on the ground, rather than on the glass 130, increasing user recognition.

The controller 140 may display the fact that a message has been received, as a character and/or character icon I1. When there is no manipulation from the user, the controller 140 may display the character and/or the character icon I1 for a predetermined period of time, starting from the point in time at which the character was received, and stop displaying of the display region DA.

As illustrated in (b) of FIG. 24, in the second state, a call may be received. The controller 140 may display the reception of the call as a text and/or a call icon I2.

As illustrated in (a) of FIG. 25, the user may make a predetermined gesture with his fingers F with respect to the electronic device 100. For example, the user may make a gesture of touching the glass 130 of the electronic device 100.

When the user makes the gesture, the controller 140 may activate the deactivated display region DA. Namely, an image may be projected by using the projector 210.

As illustrated in (b) of FIG. 25, when a particular gesture input is received from the user, the controller 140 may sequentially display events which have been received but not checked by the user. For example, the controller 140 may display a call icon I2 indicating that there is a call not checked yet in one region.

As illustrated in (a) of FIG. 26, the user may make a predetermined gesture with his fingers F, or the like, in the electronic device 100. For example, the user may make a motion of touching the eyeglass frame of the electronic device 100.

As illustrated in (b) of FIG. 26, in response to the user's touch operation, the controller 140 may display contents of an event that the user has not checked yet. For example, the controller 140 may display a message icon I1 and/or a character.

As illustrated in (a) of FIG. 27, when the electronic device 100 is in the second state, a message may be received. The controller 140 may display the message icon I1, or the like, in order to indicate that a message reception event has occurred.

As illustrated in (b) of FIG. 27, in a case in which a particular event, such as reception of the message icon I1, occurs, the user may wear the electronic device 100 and perform a follow-up operation. In this case, the user may grasp the eyeglass frames 161 and wear the electronic device 100. For example, the user may grasp first and second touch points TP1 and TP2 to wear the electronic device 100.

When the user grasps at least one among the first and second touch points TP1 and TP2 and wears the electronic device 100 to enter the first state, the controller 140 may display related contents on the glasses 130. Namely, the controller 140 may display content in a manner different from that of the second state. When the user touches at least one among the first and second touch points TP1 and TP2 or when switchover to the first state is completed, the controller 140 may stop displaying of the content using the projector 210.

When a touch is applied to at least one among the first and second touch points TP1 and TP2, the controller 140 may determine that a state of the electronic device 100 is changed. For example, in a state in which the electronic device 100 is not worn, when at least one of the first and second touch points TP1 and TP2 is touched, the controller 140 may determine that the electronic device 100 is changed to the first state in which the electronic device 100 is worn. A touch point may be a portion other than the first and second touch points TP1 and TP2. For example, a touch input applied to a front side or a rear side of the electronic device 100 may be obtained.

The controller 140 may determine a state of the electronic device 100 by combining the obtained other signal with a touch signal. For example, after a touch is applied to at least one of the first and second touch points TP1 and TP2, when a motion of picking up the electronic device 100 is sensed, the controller 140 may determine that a state of the electronic device 100 has been changed.

The controller 140 may perform different operations according to touched points. For example, when the first touch point TP1 is touched, the controller 140 may display an image on a display close to the first touch point TP1, and when the second touch point TP2 is touched, the controller 140 may display an image on a display close to the second touch point TP2. The operation corresponding to the touched position may also be applied to a case in which the electronic device 100 is worn, in a similar manner.

As illustrated in (a) of FIG. 28, a plurality of events not checked by the user yet may be on standby in the electronic device 100. For example, an unread message event and a missing call event may exist. The presence of the plurality of events may be indicated by a message icon I1, a call icon I2, and the like.

As illustrated in (b) of FIG. 28, the user may touch any one of the first and second touch points TP1 and TP2 depending on an event that the user wants to check. For example, when the user touches the first touch point TP1, the controller 140 may display contents related to the call icon I2 at the first touch point TP1 side. When the user touches the second touch point TP2, the controller 1400 may display contents related to the message icon I1 at the second touch point TP2 side. Namely, when the user's touch applied to the electronic device 100 is sensed, the controller 140 may display contents related to the content corresponding to the touch operation.

The electronic device 100 may be more conveniently used by performing an operation corresponding to a gesture input that the user may recognize by intuition.

FIG. 29 is a flow chart illustrating a process of sensing the current state of the electronic device of FIG. 1, and FIG. 30 is a view illustrating methods of sensing the current state of the electronic device of FIG. 1.

As illustrated, the current state of the electronic device 100 may be determined based on state information of the electronic device 100 obtained directly and/or indirectly.

The controller 140 may sense a state of the electronic device 100 through a direct and/or indirect means (S12).

The electronic device 100 may be in various states. For example, the electronic device 100 may be in a state in which the user wears it or may be in a state in which the user does not wear it. The electronic device 100 according to an embodiment of the present invention may be a device worn on the user's face. Thus, a state in which the electronic device 100 is worn may be a state in which the eyeglass frame 161 constituting the electronic device 100 are opened and coupled to the user's face. A state in which the electronic device 100 is not worn may include a state in which the electronic device 100 is placed on the ground or may be held in the user's hand, rather than being on the user's face.

A state of the electronic device 100 may be sensed through a direct and/or indirect method. The direct and/or indirect methods for sensing a state of the electronic device 100 are illustrated in FIG. 30.

The direct method may be a method for sensing a state through a sensor. For example, a wearing state of the user may be directly sensed through a state of a wearing sensor, a camera, eyeglass frames, and the like. Information obtained by a direct sensing device may be first information. The direct method may be relative accurate, but costs may be relatively increased due to the attachment of sensors, or the like.

The indirect method may be a method other than sensing a state directly by a sensor. For example, a wearing state of the user may be indirectly estimated by estimating a time previously set by the user, whether charging is performed, and the like. Information obtained by an indirect sensing device may be second information. Details of the direct method and the indirect method will be described in relevant portions hereinafter.

The controller 140 may sense the current state by combining the sensed information (S14).

The sensed information may be at least one information. For example, there may be second information obtained by performing charging, in addition to the first information obtained by the camera.

The controller 140 may determine whether the electronic device 100 is worn based on at least one of the first and second information. Combining information may provide a basis for more accurately determining the current state of the electronic device 100. Namely, information based on a plurality of information, rather than single information, may be more accurate.

By combining information, the current state of the electronic device 100 may be sensed at relatively low costs. For example, since the current state of the electronic device 100 is determined by combining information obtained through an existing device installed in the electronic device 100, rather than information obtained through sensors, or the like, increasing costs due to installation thereof, reliability of determination may be increased and an increase in manufacturing costs may be minimized.

FIGS. 31 and 32 are views illustrating a sensing method using sensors in the electronic device of FIG. 1.

As illustrated in FIGS. 31 and 32, whether the electronic device 100 according to an embodiment of the present invention is worn may be directly sensed through wearing sensors 210 installed in the electronic device 100.

As illustrated in FIG. 31, the wearing sensors 210 may be positioned in portions in contact with the user's body as the electronic device 100 is worn. For example, a first sensor 212 may be positioned in an end portion of the leg of the eyeglass frame 161 directly in contact with the user's head and/or a second sensor 214 may be positioned in a portion in contact with the user's nose.

The first and second sensors 212 and 214 may sense whether the electronic device 100 is worn through a method such as sensing pressure applied when the electronic device 100 is worn and/or sensing a change in an electromagnetic field generated when the electronic device 100 is brought into contact with the user's body.

As illustrated in FIG. 32, information may be obtained from a motion sensor capable of sensing a user's motion in the electronic device 100.

The motion sensor may include an accelerometer, or the like. Thus, a quantity of motion generated due to a user's motion may be sensed.

The controller 140 may determine that the electronic device 100 is not worn between t1 and t2 and between t3 and t4 in which the quantity of motion is 0.

FIG. 33 is a view illustrating a sensing method using a camera in the electronic device of FIG. 1.

As illustrated in FIG. 33, whether the electronic device 100 according to an embodiment of the present invention is worn may be sensed through the camera 110.

The camera 110 may be a device that may sense a state in which the electronic device 100 is worn. Namely, the camera 110 may be one of direct sensing devices generating first information for determining whether the electronic device 100 is worn, by analyzing an image that may differ depending on whether the electronic device 100 is worn.

A first image VA1 captured through the camera 110 when the user wears the electronic device 100 and a second image VA2 captured through the camera 110 when the electronic device 100 is placed on the ground may be different. For example, the second image VA2 may be an image obtained by capturing the same object for a predetermined period of time. The controller 140 may determine whether the electronic device 100 is worn based on a difference between captured images.

The controller 140 may determine whether information is accurate by the camera 110 according to determination based on different information. For example, in case of information obtained through a motion sensor, when a motion of the electronic device 100 is not sensed for more than a predetermined period of time, capturing of an image may be attempted by the camera 110. When there is no change in an imaged object according to the result of the image capturing through the camera 110, the controller 140 may determine that the electronic device 100 is not worn.

FIG. 34 is a view illustrating a sensing method according to states of eyeglass frame of the electronic device of FIG. 1.

As illustrated in FIG. 34, the controller 140 of the electronic device according to an embodiment of the present invention may determine whether the electronic device 100 is worn based on a state of the eyeglass frames 161.

As illustrated in (a) of FIG. 34, the eyeglass frames 161 of the electronic device 100 may be in an unfolded state. Or, as illustrated in (b) through (d) of FIG. 34, at least one of the eyeglass frames 161 of the electronic device 100 may be in a folded state.

The controller 140 may sense a state of the eyeglass frames 161. For example, the controller 140 may sense whether the eyeglass frames 161 are folded or unfolded through a frame sensor.

The controller 140 may sense a state of the electronic device 100 based on whether the eyeglass frames 161 are folded. For example, when at least one of the eyeglass frames 161 is folded, the controller 140 may determine that the electronic device 100 is not worn. However, when both the eyeglass frames 161 are unfolded, the controller 140 may determine that the electronic device 100 is worn.

FIG. 35 is a view illustrating a sensing method based on time in the electronic device of FIG. 1.

As illustrated in FIG. 35, whether the electronic device 100 according to an embodiment of the present invention is worn may be determined according to time set by the user and/or the controller 140.

The controller 140 may determine whether the electronic device 100 according to an embodiment of the present invention is worn according to a pre-set time. For example, the controller 140 may determine that the electronic device 100 is not worn within a time range set by the user as a non-wearing time, and the controller 140 may estimate that the electronic device 100 is worn within a time range set by the user as a wearing time.

The wearing time and non-wearing time may be applied by a user setting. Namely, when the user tends not to wear the electronic device 100 for a particular period of time, the user may set the particular period of time in advance to effectively use a battery of the electronic device 100.

The wearing time and non-wearing time may be set by the controller 140. For example, the controller 140 may sense a period of time during which the electronic device 100 is used through a motion sensor, or the like. Upon sensing the period of time during which the electronic device 100 is used, the controller 140 may schedule the period of time during which the electronic device 100 is used. The controller 140 may estimate wearing or non-wearing of the electronic device 100 within the time range according to the scheduled time.

FIG. 36 is a view illustrating a sensing method based on charging in the electronic device of FIG. 1.

As illustrated in FIG. 36, the controller 140 of the electronic device 100 according to an embodiment of the present invention may determine whether the electronic device 100 is worn based on whether the electronic device 100 is being charged.

The electronic device 100 may need to be re-charged at predetermined periods according to a usage degree. The electronic device 100 may be charged through a charging device 300. For example, the electronic device 100 may be charged by connecting a charging line extending from the charging device 300 to the electronic device 100.

When charging is performed on the electronic device 100, the controller 140 may determine that the electronic device 100 is not worn. This may be based on inspection of a general usage aspect of the user with respect to the electronic device 100.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:

1. An electronic device comprising:
   a display generating light;
   a first optical lens including:
      a first surface facing the display, the first surface provided with the light from the display; and
      a second surface opposite to the first surface;
   a second optical lens including:
      a first surface facing the second surface of the first optical lens, the first surface of the second optical lens provided with the light from the first optical lens; and
      a second surface opposite to the first surface;
   a light guide including:
      an incidence surface facing the second surface of the second optical lens, the incidence surface provided with the light from the second surface of the second optical lens;
      a transmission surface spaced apart from the incidence surface, the transmission surface transmitting the light toward an outside of the light guide; and
      a reflector facing both the incidence surface and the transmission surface;
   a wearing sensor configured to sense whether the electronic device is worn on a user; and
   a controller electrically connected to the wearing sensor and the second optical lens, the controller is configured to provide the second optical lens with a control signal based on a sensed value from the wearing sensor,
   wherein the second optical lens is positioned between the first optical lens and the light guide,
   wherein the incidence surface is positioned between the first optical lens and the transmission surface, and
   wherein a shape of the second optical lens is changed when the control signal is changed.

2. The electronic device of claim 1,
   wherein a shape of the second surface of the second optical lens is changed when the control signal is changed.

3. The electronic device of claim 2, wherein when the electronic device is not worn on the user, the controller determines a projection surface in which an image is to be displayed, based on at least one among a color and a material of a seating surface on which the electronic device is placed.

4. The electronic device of claim 1, wherein the second optical lens operates in at least one of a first mode in which the light which has passed through the second optical lens is diverged, a second mode in which the light which has passed through the second optical lens is converged, a third mode in which there is no change in an optical path of the light before and after the light passes through the second optical lens, and a fourth mode in which the light which has passed through the second optical lens is refracted in a particular direction.

5. The electronic device of claim 1, further comprising
   a camera configured to obtain an external image, wherein the camera is electrically connected to both the wearing sensor and the controller, wherein the wearing sensor senses a current state among a first state in which the electronic device is worn on the user and a second state in which the electronic device is not worn on the user, and
   wherein the controller displays content in different manners in accordance with the current state.

6. The electronic device of claim 5, further comprising:
   a projector,
   wherein the controller projects the content toward a projection surface by using the projector in the second state.

7. The electronic device of claim 6, wherein the controller changes at least one among a color, contrast, and brightness of the projected content based on a state of the projection surface.

8. The electronic device of claim 1, further comprising a frame coupled to at least one point of a user's face to allow the electronic device to be worn on the user's face,
   wherein the controller is installed in the frame and is configured to determine whether the electronic device is worn on the user's face based on a first information obtained from a direct sensing device coupled to the frame, and
   wherein the direct sensing device includes at least one of:
      a contact sensor electrically connected to the controller, the contact sensor is configured to contact the user;
      a camera electrically connected to the controller;
      a frame sensor electrically connected to the controller, the frame sensor is configured to sense a state of the frame; and
      a motion sensor electrically connected to the controller, the motion sensor is configured to sense a movement of the electric device.

9. The electronic device of claim 1, wherein the first surface of the second lens is flat.

10. The electronic device of claim 1, wherein at least a portion of the light is internally reflected totally from the incidence surface to the reflector.

11. The electronic device of claim 8, wherein the controller is configured to determine whether the electronic device in worn on the user's face based on at least one among the first information and a second information, and wherein the second information includes information whether the electronic device is being electrically charged.

12. A method for controlling an electronic device including a display, a first optical lens, a second optical lens, a wearing sensor configured to sense whether the electronic device is worn on a user and a light guide, wherein the second optical lens is positioned between the first optical lens and the light guide and wherein the second optical lens includes a rear surface facing the light guide, the method comprising:

sensing whether the electronic device is worn on a user's face by using the wearing sensor;

when the electronic device is worn on the user's face, forming the rear surface of the second optical lens in a first shape for forming a first optical path from the display toward an eyeball of the user via the first optical lens, the second optical lens, and the light guide, sequentially; and when the electronic device is not worn on the user's face, forming the rear surface of the second optical lens in a second shape for forming a second optical path from the display toward a projection surface formed on a seating surface on which the electronic device is placed, via the first optical lens, the second optical lens, and the light guide, sequentially, and wherein a shape of the second surface of the second optical lens corresponds to a sensed value from the wearing sensor.

13. The method of claim 12, wherein the forming of the second optical path comprises:

determining a position of the projection surface; and forming the shape of the second optical lens in accordance with the position of the projection surface.

14. The method of claim 13, wherein the forming of the second optical path comprises:

changing the projection surface based on at least one among a color and a material of the projection surface.

* * * * *